US012198668B2

(12) United States Patent
Yamamoto et al.

(10) Patent No.: US 12,198,668 B2
(45) Date of Patent: Jan. 14, 2025

(54) ACOUSTIC APPARATUS AND ACOUSTIC CONTROL METHOD

(71) Applicant: PANASONIC INTELLECTUAL PROPERTY MANAGEMENT CO., LTD., Osaka (JP)

(72) Inventors: Masami Yamamoto, Osaka (JP); Takayosi Okazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 235 days.

(21) Appl. No.: 17/913,123

(22) PCT Filed: Sep. 27, 2021

(86) PCT No.: PCT/JP2021/035428
§ 371 (c)(1),
(2) Date: Sep. 20, 2022

(87) PCT Pub. No.: WO2022/168365
PCT Pub. Date: Aug. 11, 2022

(65) Prior Publication Data

US 2023/0116597 A1 Apr. 13, 2023

(30) Foreign Application Priority Data

Feb. 5, 2021 (JP) ................................ 2021-017458

(51) Int. Cl.
*G10K 11/178* (2006.01)
*H04R 1/10* (2006.01)

(52) U.S. Cl.
CPC ............ *G10K 11/178* (2013.01); *H04R 1/10* (2013.01)

(58) Field of Classification Search
None
See application file for complete search history.

(56) References Cited

U.S. PATENT DOCUMENTS 10,636,405 B1 4/2020 Kemmerer
2013/0261775 A1 10/2013 Ono et al.
(Continued)

FOREIGN PATENT DOCUMENTS

CN 110830862 A 2/2020
CN 111447523 A 7/2020
(Continued)

OTHER PUBLICATIONS

Extended European Search Report, dated Dec. 4, 2023, for European Patent Application No. 21924753.3—1207. (9 pages).
(Continued)

*Primary Examiner* — Qin Zhu
(74) *Attorney, Agent, or Firm* — Seed IP Law Group LLP

(57) ABSTRACT

An acoustic apparatus includes a sound-emitting unit that acoustically outputs a sound signal, at least one sensor that periodically detects accelerations of the user in three directions including a front-rear direction, a left-right direction, and an upper-lower direction, a vibration sound peak detection unit detecting a peak of a vibration sound based on a movement of the user when detection values of the accelerations in the front-rear direction, the left-right direction, and the upper-lower direction satisfy a predetermined condition, and a signal processing unit that determines whether a time difference at which the peak of the vibration sound is detected is periodic. When it is determined that the time difference is periodic, the signal processing unit sets a gain of a cancellation signal to be suppressed from the sound signal acoustically output from the sound-emitting unit based on the peak of the vibration sound.

10 Claims, 13 Drawing Sheets

(56) References Cited

U.S. PATENT DOCUMENTS

| | | | | |
|---|---|---|---|---|
| 2016/0267898 | A1* | 9/2016 | Terlizzi | G10K 11/17885 |
| 2019/0224529 | A1 | 7/2019 | Jung et al. | |
| 2020/0236466 | A1 | 7/2020 | Zhao et al. | |
| 2020/0396533 | A1* | 12/2020 | Meiyappan | G10L 15/22 |

FOREIGN PATENT DOCUMENTS

| | | | |
|---|---|---|---|
| CN | 111586522 | A | 8/2020 |
| JP | 2011059376 | A | 3/2011 |
| JP | 2013208266 | A | 10/2013 |
| JP | 2019531772 | A | 11/2019 |

OTHER PUBLICATIONS

International Search Report, mailed Dec. 7, 2021, for International Patent Application No. PCT/JP2021/035428. (5 pages) (with English translation).

* cited by examiner

ACOUSTIC APPARATUS AND ACOUSTIC CONTROL METHOD

TECHNICAL FIELD

The present disclosure relates to an acoustic apparatus and an acoustic control method.

BACKGROUND ART

A technique of canceling noise by superimposing a sound having a phase opposite to that of the noise that leaks into an ear pad of a headphone on a sound based on an input audio signal and acoustically outputting the sound in the ear pad has been known. For example, Patent Literature 1 proposes a headphone with a noise reduction device that reduces a noise cancellation amount when a predetermined specific sound is emitted from an outside.

CITATION LIST

Patent Literature

Patent Literature 1: JP-A-2011-59376

SUMMARY OF INVENTION

Technical Problem

According to Patent Literature 1, when the specific sound (for example, a siren sound of an emergency vehicle or a crossing sound of a train) is generated, a noise cancellation amount is reduced. Therefore, a user may listen to the specific sound (see the above description) emitted from the outside without lowering a volume thereof during appreciation of music based on an audio signal supplied from an audio device. However, in Patent Literature 1, it is not considered to efficiently reduce noise such as a vibration sound having a high level generated by the user moving his/her body (for example, feet of the user land on ground during jogging), for example, jogging.

The present disclosure provides an acoustic apparatus and an acoustic control method that efficiently reduce noise such as a vibration sound generated in accordance with a movement of a user in a motion such as jogging, and that prevent deterioration in sound quality of an acoustically output sound.

Solution to Problem

The present disclosure provides an acoustic apparatus to be worn by a user in a motion, the acoustic apparatus including: a sound-emitting unit configured to acoustically output a sound signal; at least one sensor configured to periodically detect accelerations of the user in three directions including a front-rear direction, a left-right direction, and an upper-lower direction; a vibration sound peak detection unit configured to detect a peak of a vibration sound based on a movement of the user when detection values of the accelerations in the front-rear direction, the left-right direction, and the upper-lower direction satisfy a predetermined condition; and a signal processing unit configured to determine whether a time difference at which the peak of the vibration sound is detected is periodic, in which the signal processing unit sets a gain of a cancellation signal to be suppressed from the sound signal acoustically output from the sound-emitting unit based on the peak of the vibration sound when it is determined that the time difference at which the peak of the vibration sound is detected is periodic.

Further, the present disclosure provides an acoustic control method executed by an acoustic apparatus to be worn by a user in a motion, the acoustic control method including: a step of acoustically outputting a sound signal; a step of periodically detecting accelerations of the user in three directions including a front-rear direction, a left-right direction, and an upper-lower direction at at least one position; a step of detecting a peak of a vibration sound based on a movement of the user when detection values of the accelerations in the front-rear direction, the left-right direction, and the upper-lower direction satisfy a predetermined condition; and a step of determining whether a time difference at which the peak of the vibration sound is detected is periodic, in which when it is determined that the time difference at which the peak of the vibration sound is detected is periodic during the determination, a gain of a cancellation signal to be suppressed from the acoustically output sound signal is set based on the peak of the vibration sound.

Advantageous Effects of Invention

According to the present disclosure, it is possible to efficiently reduce noise such as a vibration sound generated in accordance with a movement of a user in a motion such as jogging, and to prevent deterioration in sound quality of an acoustically output sound.

DESCRIPTION OF EMBODIMENTS

Hereinafter, a plurality of embodiments specifically disclosing an acoustic apparatus and an acoustic control method according to the present disclosure will be described in detail with reference to the drawings as appropriate.

However, unnecessarily detailed description may be omitted. For example, detailed description of a well-known matter or repeated description of substantially the same configuration may be omitted. This is to avoid unnecessary redundancy in the following description and to facilitate understanding of those skilled in the art. Further, each of the accompanying drawings is referred to in accordance with a direction of a reference sign. It should be noted that the accompanying drawings and the following description are provided for a thorough understanding of the present disclosure by those skilled in the art, and are not intended to limit the subject matter recited in the claims.

For example, in the present disclosure, an overhead type headphone worn on a head of a user will be described as an example of the present disclosure as the acoustic apparatus, but the present disclosure is not limited thereto and may be an earphone type. That is, the present disclosure can also be applied to an earphone in which a main body portion and ear pads as a casing that surrounds or covers ears are not provided. Further, the present disclosure is not limited to a form of a headphone, an earphone, or the like as long as the apparatus includes a driver, a microphone, or the like, and content of the present disclosure can be appropriately applied as long as the apparatus is used as the acoustic apparatus.

A "unit" or an "apparatus/device" referred to in each of the embodiments is not limited to a physical configuration simply mechanically implemented by hardware, and includes a configuration in which a function of the configuration is implemented by software such as a program. Further, a function of one configuration may be implemented by two or more physical configurations, or functions of two or more configurations may be implemented by, for example, one physical configuration.

First Embodiment

A first embodiment according to the present disclosure will be described with reference to FIGS. 1 to 7.

[Hardware Configuration of Headphone]

Figure 1:
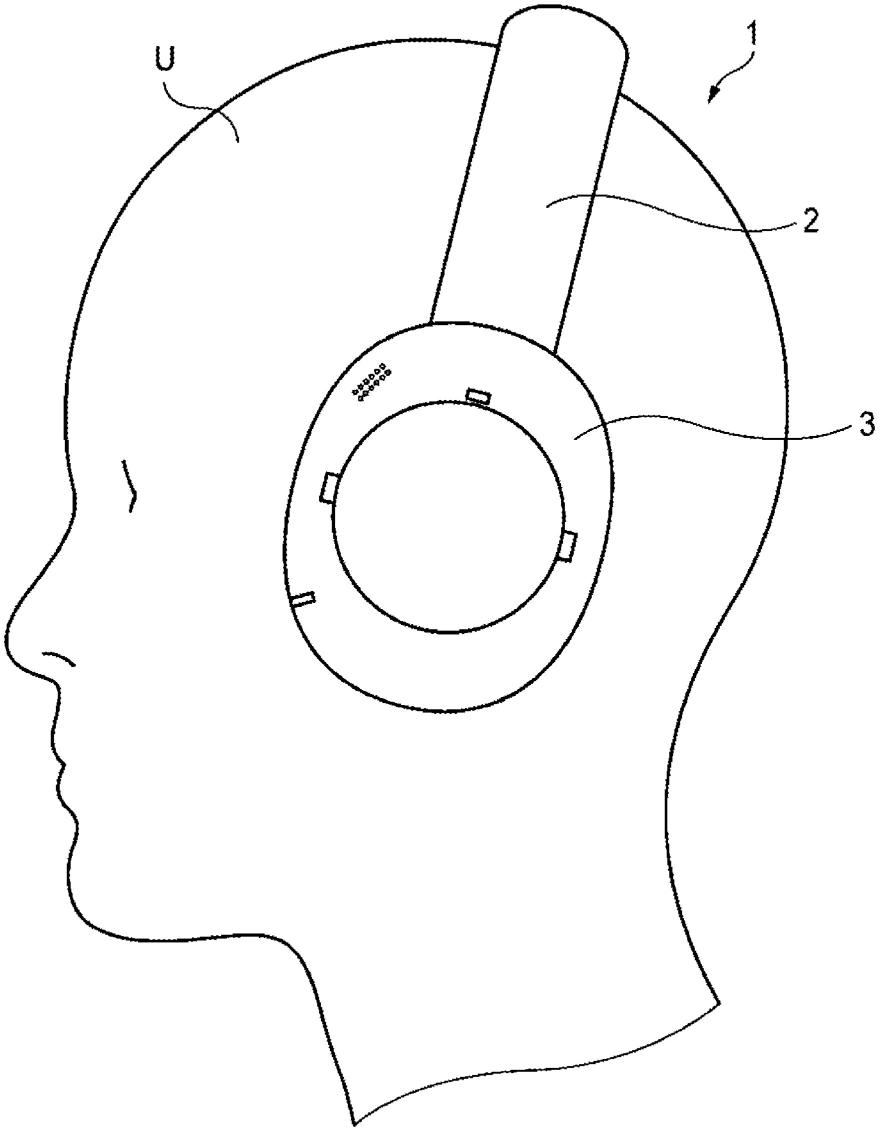
FIG. 1 is a side view exemplifying a state where a headphone of a first embodiment is worn on a head of a user.
Figure 2:
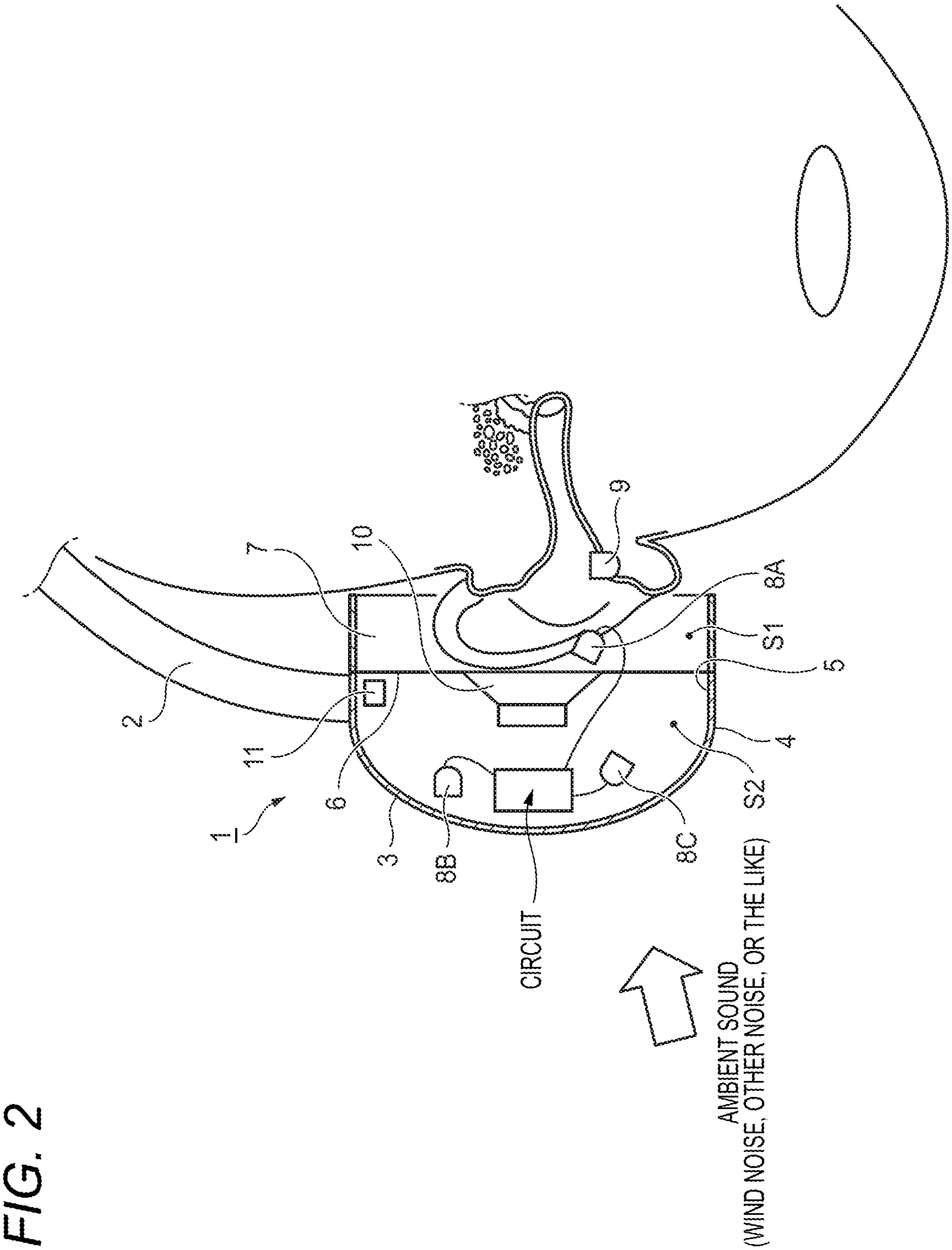
FIG. 2 is a cross-sectional view schematically exemplifying a hardware configuration inside the headphone shown in FIG. 1.
Figure 3:
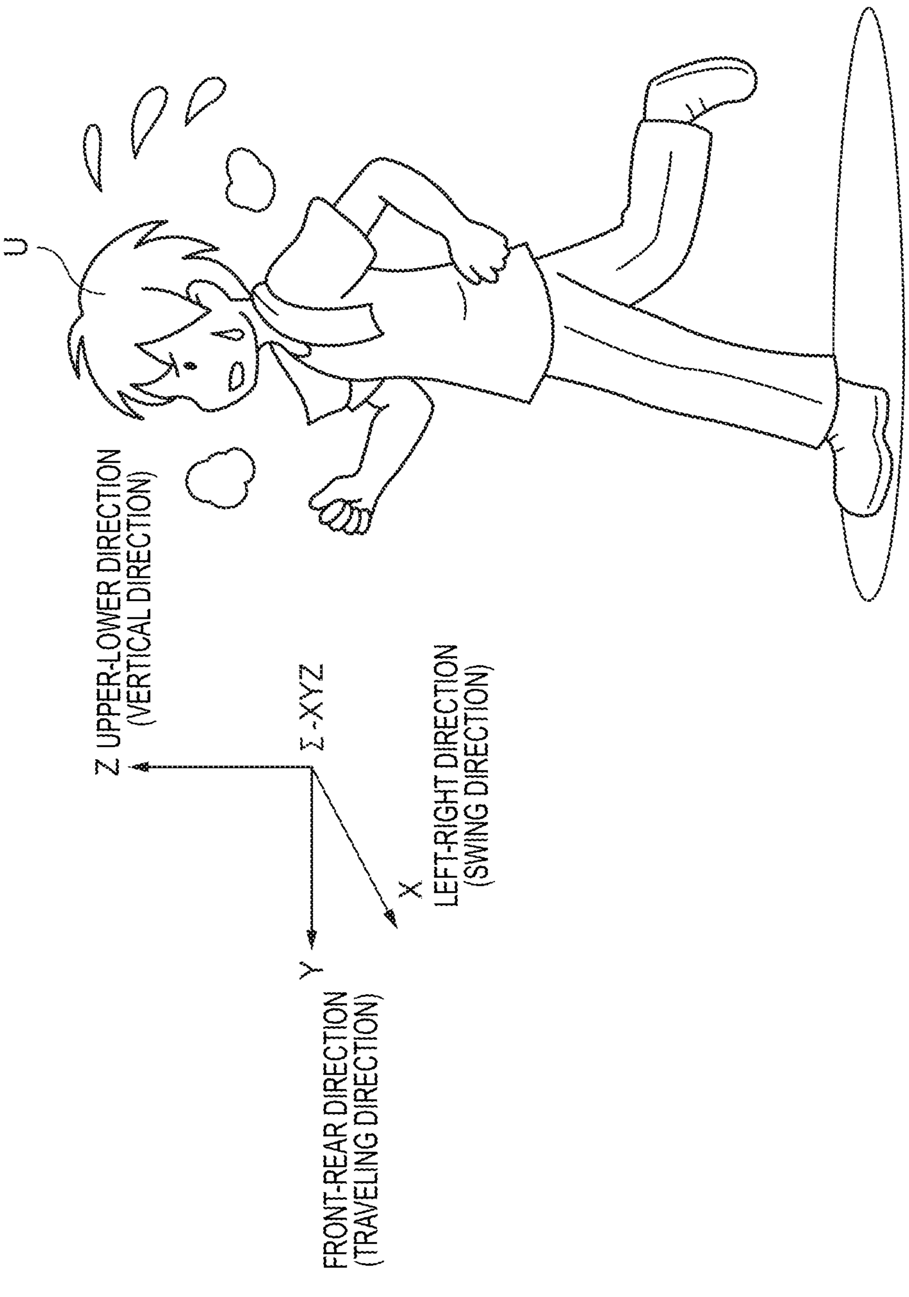
FIG. 3 is a schematic diagram illustrating setting of a coordinate system in the headphone shown in FIG. 2.

A hardware configuration of a headphone 1 (an example of the acoustic apparatus) according to the present embodiment will be described with reference to FIGS. 1 to 3. FIG. 1 is a side view exemplifying a state where the headphone 1 of the present embodiment is worn on a head of a user U. FIG. 2 is a cross-sectional view schematically exemplifying the hardware configuration inside the headphone 1 shown in FIG. 1. FIG. 3 is a schematic diagram illustrating setting of a coordinate system in the headphone 1 shown in FIG. 2.

As shown in FIGS. 1 and 2, the headphone 1 of the present embodiment is, for example, an overhead type, and includes a headband 2 and a pair of main body portions 3 arranged at both end portions of the headband 2. Further, in the present embodiment, the headphone 1 includes a wireless communication unit CP1 (see FIG. 4) that can communicate in accordance with a communication standard of, for example, Bluetooth (registered trademark), and is wirelessly connected to a sound source apparatus such as a radio apparatus or a music playback apparatus as a music playback application, a telephone apparatus such as a smartphone P (an example of a terminal) as a telephone application, or the like. The headphone 1 receives an acoustic signal, a music signal, a control signal, and the like transmitted from these apparatuses in the wireless communication unit CP1 (see FIG. 4), and outputs the acoustic signal as a sound wave, or collects an utterance of the user U and transmits a sound collection result thereof to these apparatuses. In the present embodiment, the smartphone P is shown and described as an example of an apparatus that is a counterpart with which the headphone 1 performs wireless communication, but the present invention is not limited thereto, and the headphone 1 can be connected to various apparatuses as long as wireless communication is possible. Further, in the following description, it is assumed that the term "acoustic signal" includes a concept of the music signal unless otherwise specified.

The headband 2 is formed of an elongated member, is formed to be curved in a substantially arc shape, and is elastically provided. The headband 2 sandwiches the head of the user U from both left and right sides of the head of the user U in a state where the headphone 1 is worn by the user U. Accordingly, the headphone 1 can be fixedly worn on the head of the user U by pressing the pair of main body portions 3 against portions of the head of the user U on both left and right sides by elasticity of the headband 2. A pair of expansion and contraction mechanisms may be provided in the headband 2 of the present embodiment, and a length of the headband 2 may be adjustable in accordance with a size of the head of the user U or the like by expansion and contraction of the pair of expansion and contraction mechanisms.

Each of the pair of main body portions 3 is a member abutted against the ear of the user U who wears the headphone 1, and is formed in a dome shape or an egg shape. When the headphone 1 is worn on the head of the user U, each of the pair of main body portions 3 is disposed so as to cover the ear of the user U, and this disposed state is a normal use state of the headphone 1. Further, each of the pair of main body portions 3 includes a housing 4, a partition plate 6, and an ear pad 7 as structural members.

The housing 4 forms an outer contour of the main body portion 3, is formed in a dome shape, and includes an opening portion 5. The housings 4 are attached to the headband 2 such that the opening portions 5 are arranged to face each other by sandwiching the head of the user U in a state where the headphone 1 is worn by the user U.

The partition plate 6 is a plate-shaped member, and forms an inner contour of the main body portion 3 and is disposed to close the opening portion 5 of the housing 4. A through hole is formed in a central portion of the partition plate 6, and a driver 10 (described later) is fitted into and fixed to the through hole. A housing space S2 is defined by the housing 4 and the partition plate 6.

The ear pad 7 is formed in an annular shape, and covers the ear of the user U who wears the headphone 1 so as to wrap the ear from a side of the ear. The ear pad 7 is disposed on a peripheral edge portion of the opening portion 5 of the housing 4 to extend in a circumferential direction of the opening portion 5. Further, the ear pad 7 is formed of a material made of a soft resin, and is provided around the ear of the user U so as to be deformable in accordance with a shape of the ear. The deformation can improve adhesion between the ear pad 7 and a periphery of the ear of the user U. An acoustic space S1 is defined by the ear pad 7 and the partition plate 6. In a state where the headphone 1 is worn by the user U, the acoustic space S1 is a sealed space including an auricle of the user U in a contact region of the ear pad 7. In the acoustic space S1, leakage of a sound to an outside of the headphone 1 and intrusion of an ambient sound to an inside of the headphone 1 are physically prevented by the ear pad 7.

Each of the pair of main body portions 3 includes the driver 10 (an example of a sound-emitting unit), a plurality of microphones (for example, an internal microphone 8A, an external microphone 8B, and an utterance microphone 8C), a bone-conduction sensor 9 (an example of an utterance sensor), a circuit board 20, and an acceleration sensor 11 (an example of a sensor) as electric and electronic members.

The driver 10 outputs a signal such as the acoustic signal or the music signal. Specifically, the driver 10 incorporates a diaphragm, and converts an acoustic signal into a sound wave (that is, vibration of air) by vibrating the diaphragm based on the acoustic signal input to the driver 10. The sound wave output from the driver 10 propagates to an eardrum of the ear of the user U.

The plurality of microphones include at least three types of the internal microphone 8A, the external microphone 8B, and the utterance microphone 8C. In the present embodiment, as will be described later, the external microphone 8B and the utterance microphone 8C operate as sound-collection devices that collect an ambient sound of the user U.

The internal microphone 8A is disposed such that a detection portion thereof faces the acoustic space S1 inside the acoustic space S1 defined by the ear pad 7 and the partition plate 6. Further, the internal microphone 8A is disposed as close as possible to an ear canal of the ear of the user U in the acoustic space S1. Accordingly, the internal microphone 8A collects acoustics physically generated in the acoustic space S1 including the sound wave output from the driver 10.

That is, the internal microphone 8A is provided so as to be able to collect noise that enters the acoustic space S1 through the housing 4, the ear pad 7, and the like as an echo signal together with an acoustic signal or a music signal output from the driver 10. Further, the internal microphone 8A is electrically connected to the circuit board 20 by a signal line, and a detection result thereof is transmitted to the circuit board 20.

The external microphone 8B and the utterance microphone 8C are housed in the housing space S2 defined by the housing 4 and the partition plate 6. A plurality of through holes are formed in the housing 4, and the external microphone 8B and the utterance microphone 8C are attached to the housing 4 so as to be able to collect acoustics outside the headphone 1 through the respective through holes.

The external microphone 8B is disposed so as to be able to collect ambient noise outside the headphone 1. Further, the utterance microphone 8C is disposed so as to be able to collect an utterance of the user U who wears the headphone 1, and implements a so-called hands-free call together with the driver 10 in a state where the headphone 1 is able to communicate with a mobile phone apparatus such as the smartphone P. Similarly, the external microphone 8B and the utterance microphone 8C are electrically connected to the circuit board 20 by signal lines, and detection results thereof are transmitted to the circuit board 20.

The bone-conduction sensor 9 includes a piezoelectric element and the like, and converts vibration (bone-conduction vibration) transmitted to a human bone of the user U into an electric signal. The bone-conduction sensor 9 is attached to the headphone 1 so as to be able to be in contact with a face surface around the ear or a back surface of the auricle. Further, in the acoustic space S1, the bone-conduction sensor 9 is disposed apart from the driver 10. Since the acoustics uttered by the user U are conducted to the face or a head bone, vibration of the human bone is detected, a detection result thereof is converted into an electric signal, and the electric signal is output. The utterance of the user U can be detected by the electric signal. The bone-conduction sensor 9 is electrically connected to the circuit board 20 by a signal line, and a detection result thereof is transmitted to the circuit board 20.

In the present embodiment, the acceleration sensor 11 is embedded in one of the pair of main body portions 3 (the main body portion 3 on a left side in the present embodiment). Similar to the bone-conduction sensor 9, the acceleration sensor 11 converts the bone-conduction vibration of the user U into an electric signal, and detects vibration when the user U moves his/her body during sports or the like (for example, jogging, yoga, marathon, or exercise) as a vibration signal. For example, when the user U travels by jogging or the like, the acceleration sensor 11 is configured to be able to detect an impact when the user U kicks ground with both feet by alternately using the left foot and the right foot as an impulse signal of an acceleration corresponding to each of impacts (see FIG. 6, which will be described later).

As shown in FIG. 3, the acceleration sensor 11 is configured to be able to periodically detect vibrations (accelerations) of the user U in three axial directions including an upper-lower direction (a vertical direction in accordance with gravity, hereinafter, also referred to as a "Z-axis direction"), a front-rear direction (hereinafter, also referred to as a "Y-axis direction"), and a left-right direction (hereinafter, also referred to as an "X-axis direction") with respective components in a state where the user U wears the headphone 1. That is, in the present embodiment, as a detection coordinate system Σ-XYZ of the acceleration sensor 11, for example, when the user U travels, the Z-axis direction is set to be along the vertical direction, the Y-axis direction is set to be along a traveling direction of the user U, and the X-axis direction is set to be along a swing direction (a wobble direction in a lateral direction) of the user U. The acceleration sensor 11 transmits a detection result thereof to the circuit board 20 as a vibration signal with XYZ components.

The circuit board 20 is formed in a flat plate shape, and a plurality of circuits are arranged on a surface of the circuit board 20. The circuit board 20 includes a plurality of arithmetic circuits (for example, see processors PRC1 and PRC2 shown in FIG. 4), a plurality of read-only memory circuits (for example, see ROMs 34 and 46 shown in FIG. 4), a plurality of writable memory circuits (for example, see RAMs 35 and 47 shown in FIG. 4), and the like, and operates the above-described circuits as a mini-computer of the headphone 1 that appropriately performs a signal processing of the acoustic signal.

[Configuration of Circuit Board]

Figure 4:
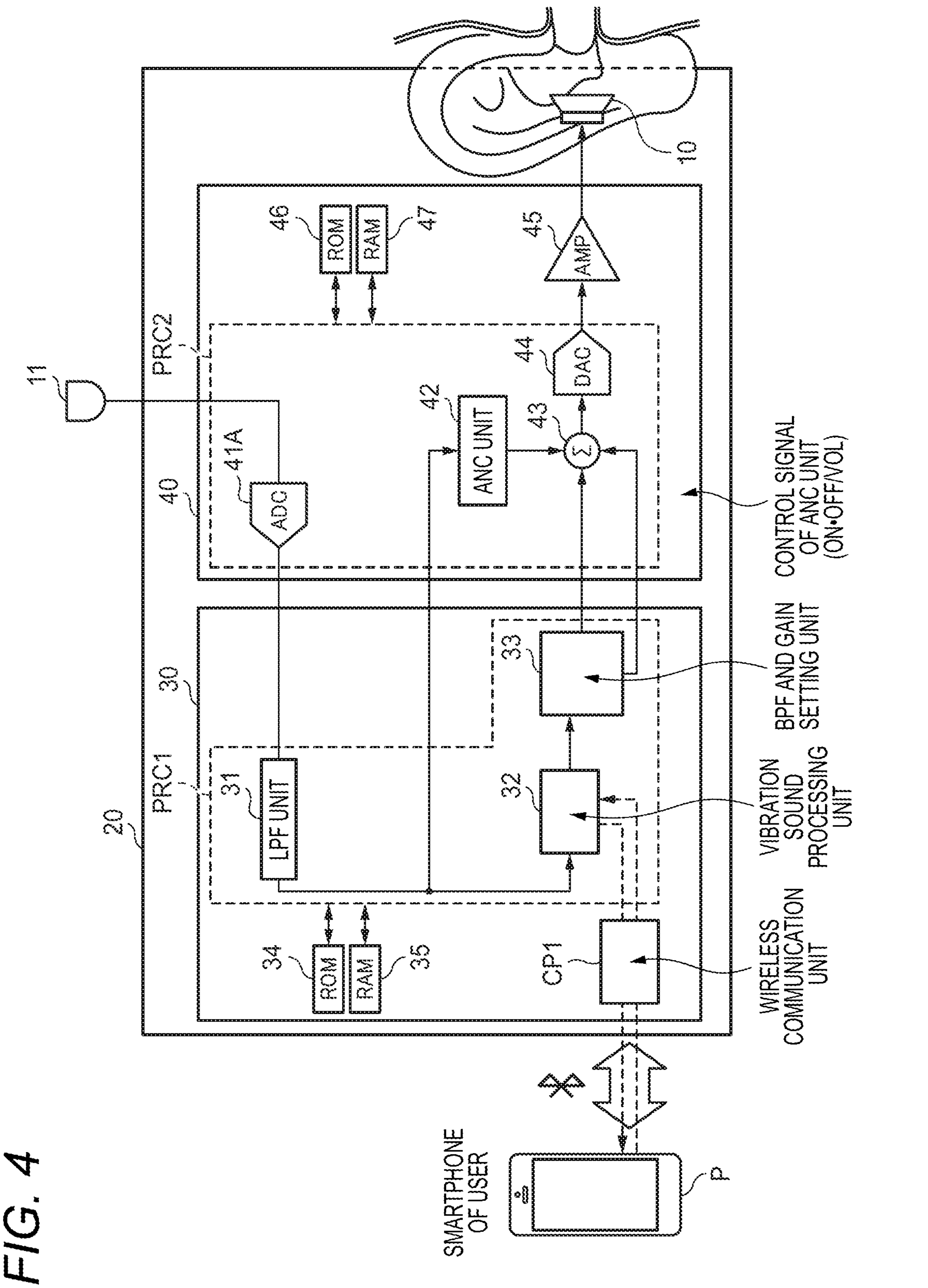
FIG. 4 is a functional block diagram exemplifying a processing of a circuit board shown in FIG. 2.

Next, a configuration of the circuit board 20 will be described with reference to FIG. 4. FIG. 4 is a functional block diagram exemplifying a processing in the circuit board 20 shown in FIG. 2. The circuit board 20 is configured as a general-purpose mini-computer as described above, and a program that serves as software and is stored and held in each circuit unit (for example, a ROM 35 of a first circuit unit 30 shown in FIG. 4, or a ROM 47 of a second circuit unit 40 shown in FIG. 4) is read and executed by an arithmetic device (see the above, for example, the processors PRC1 and PRC2 shown in FIG. 4).

In the present embodiment, a plurality of integrated circuits that specialize in a predetermined processing serving as hardware physically mounted on the circuit board 20 are also mounted on the circuit board 20. That is, each of blocks shown inside the circuit board 20 shown in FIG. 4 represents a function implemented by software such as a program or a function implemented by hardware such as a dedicated integrated circuit.

In the present embodiment, the function implemented by the circuit board 20 is implemented by both software and hardware, but the present invention is not limited thereto. For example, the entire function may be configured by hardware as a physical configuration of the "apparatus".

Further, as described above, the wireless communication unit CP1 is mounted on the circuit board 20, and in the present embodiment, the circuit board 20 is wirelessly connected to the smartphone P possessed by the user U via the wireless communication unit CP1. Further, in the present embodiment, the wireless communication unit CP1 of the headphone 1 performs communication in accordance with, for example, a communication standard of Bluetooth (registered trademark), but the present invention is not limited thereto, and the wireless communication unit CP1 may be provided to be connectable to a communication line such as Wi-Fi (registered trademark), a mobile communication line, or the like.

The smartphone P of the user U includes a display unit, and an application is installed in the smartphone P. When the user U operates the display unit, the application sets the headphone 1 to turn on or off a shock and cancellation function (see FIG. 5, which will be described later).

As shown in FIG. 4, the circuit board 20 is provided with at least the first circuit unit 30 and the second circuit unit 40. The first circuit unit 30 and the second circuit unit 40 are configured to transmit and receive control signals to and from each other so as to be controlled in a consistent manner, and to be able to exchange acoustic signals with PCM digital signals or the like.

The first circuit unit 30 includes the processor PRC1, the random access memory (RAM) 34, the read only memory (ROM) 35, and the wireless communication unit CP1. The processor PRC1 is configured using, for example, a central processing unit (CPU), a digital signal processor (DSP), or a field programmable gate array (FPGA). Specifically, the processor PRC1 includes an LPF unit 31, a vibration sound processing unit 32 (an example of a vibration sound peak detection unit), and a BPF and gain setting unit 33 (an example of a signal processing unit).

The LPF unit 31 receives a vibration signal (vibration sound) transmitted from an analog-to-digital conversion unit 41 (described later) of the second circuit unit 40. The LPF unit 31 has a function of a low pass filter, and removes high-frequency components from components of the received vibration signal to only allow low-frequency components to pass (see FIG. 7). That is, the LPF unit 31 removes noise included in the vibration signal detected by the acceleration sensor 11, and transmits the vibration signal to the vibration sound processing unit 32 and an ANC unit 42 (described later) of the second circuit unit 40 in a state where the noise is removed.

The vibration sound processing unit 32 is wirelessly connected to the smartphone P of the user U through the wireless communication unit CP1 of the circuit board 20, and transmits and receives the acoustic signal and the control signal transmitted from the smartphone P while receiving the vibration signal transmitted from the LPF unit 31. That is, the vibration sound processing unit 32 is provided so as to be able to input the acoustic signal or the music signal for playback from the smartphone P. The vibration sound processing unit 32 determines whether an operation mode (application) of the headphone 1 is a music playback application or a telephone application based on the acoustic signal and the control signal transmitted from the smartphone P of the user U, and manages an input thereof.

In the present embodiment, based on the received vibration signal, the vibration sound processing unit 32 detects a peak of the vibration signal (vibration sound) based on a movement of the user U when a detection value of an acceleration in each of the Y-axis direction (the front-rear direction, the traveling direction of the user U), the X-axis direction (the left-right direction, the swing direction of the user U), and the Z-axis direction (the upper-lower direction, the vertical direction) (see FIG. 3) satisfies a predetermined condition. The vibration sound processing unit 32 transmits the acoustic signal or the music signal from the smartphone P of the user U to the BPF and gain setting unit 33 together with a detection result of the peak.

The BPF and gain setting unit 33 receives the acoustic signal from the vibration sound processing unit 32. The BPF and gain setting unit 33 has a function of a band pass filter, and allows an acoustic component having a predetermined frequency band to pass through the received acoustic signal (see FIG. 7). Further, at the same time, the BPF and gain setting unit 33 adjusts a gain (in other words, a level) of the passed acoustic signal. Further, as will be described later, the BPF and gain setting unit 33 determines whether a time difference at which the peak of the vibration sound is detected is periodic.

When determining that the time difference at which the peak of the vibration sound is detected is periodic, the BPF and gain setting unit 33 sets a gain of a cancellation signal to be suppressed from the acoustic signal (sound signal) acoustically output from the driver 10 based on the peak of the vibration sound. The BPF and gain setting unit 33 transmits the acoustic signal in which the gain of the cancellation signal is set to an addition unit 43 of the second circuit unit 40. Further, the BPF and gain setting unit 33 transmits a control signal (for example, ON/OFF control, volume control, or the like) for controlling an input of the ANC unit 42 of the second circuit unit 40 to the addition unit 43, and manages an operation of the addition unit 43.

The RAM 34 is, for example, a work memory used during an operation of the processor PRC1, and temporarily stores data or information generated during the operation of the processor PRC1.

The ROM 35 stores, for example, a program and data necessary for executing the operation of the processor PRC1 in advance. In FIG. 4, the RAM 34 and the ROM 35 are shown to be provided as separate configurations, but the RAM 34 and the ROM 35 may be provided in the processor PRC1, and the same applies to each embodiment described later. Further, the RAM 34 and the ROM 35 may be implemented by a single memory (for example, a flash memory) having functions of the RAM 34 and the ROM 35.

The second circuit unit 40 includes the processor PRC2, the RAM 46, and the ROM 47. The processor PRC2 is configured using, for example, a CPU, a DSP, or an FPGA. Specifically, the processor PRC2 includes the analog-to-digital conversion unit 41, the ANC unit 42, the addition unit 43, a digital-to-analog conversion unit 44, and an amplifier unit 45.

The analog-to-digital conversion unit 41 is electrically connected to the acceleration sensor 11, receives an analog signal of a vibration signal detected by the acceleration sensor 11, and converts the analog signal into a digital signal. The analog-to-digital conversion unit 41 transmits the digital signal to the LPF unit 31 of the first circuit unit 30.

The ANC unit 42 has an active noise removal function, receives the digital signal of the vibration signal from the LPF unit 31 of the first circuit unit 30, and dynamically generates, for example, an opposite-phase signal of the digital signal as a cancellation signal to be suppressed from the acoustic signal acoustically output from the driver 10. The ANC unit 42 transmits the dynamically generated cancellation signal to the addition unit 43.

The addition unit 43 receives the opposite-phase signal (an example of the cancellation signal) from the ANC unit 42 and the acoustic signal from the BPF and gain setting unit 33, performs an addition processing on these signals, and transmits an addition result thereof to the digital-to-analog conversion unit 44. Further, during the addition processing, the addition unit 43 dynamically controls on/off of the addition processing or a volume of the signal output from the ANC unit 42 based on the above-described control signal transmitted from the BPF and gain setting unit 33. With this dynamic addition processing, periodic noise (see FIG. 6) generated by sports such as jogging of the user U, which will be described later, is actively removed or prevented.

The digital-to-analog conversion unit 44 converts the addition result of the addition unit 43 into an analog signal, and transmits the converted analog signal to the amplifier unit 45.

The amplifier unit 45 is electrically connected to the driver 10, amplifies the analog signal transmitted from the digital-to-analog conversion unit 44, and transmits the amplified analog signal to the driver 10.

The RAM 46 is, for example, a work memory used during an operation of the processor PRC2, and temporarily stores data or information generated during the operation of the processor PRC2.

The ROM 47 stores, for example, a program and data necessary for executing the operation of the processor PRC2 in advance. In FIG. 4, the RAM 46 and the ROM 47 are shown to be provided as separate configurations, but the RAM 46 and the ROM 47 may be provided in the processor PRC2, and the same applies to each embodiment described later. Further, the RAM 46 and the ROM 47 may be implemented by a single memory (for example, a flash memory) having functions of the RAM 46 and the ROM 47.

The driver 10 outputs a signal such as the acoustic signal or the music signal as a physical air vibration (sound wave) based on the transmission.

[Processing Flow of Circuit Board]

Figure 5:
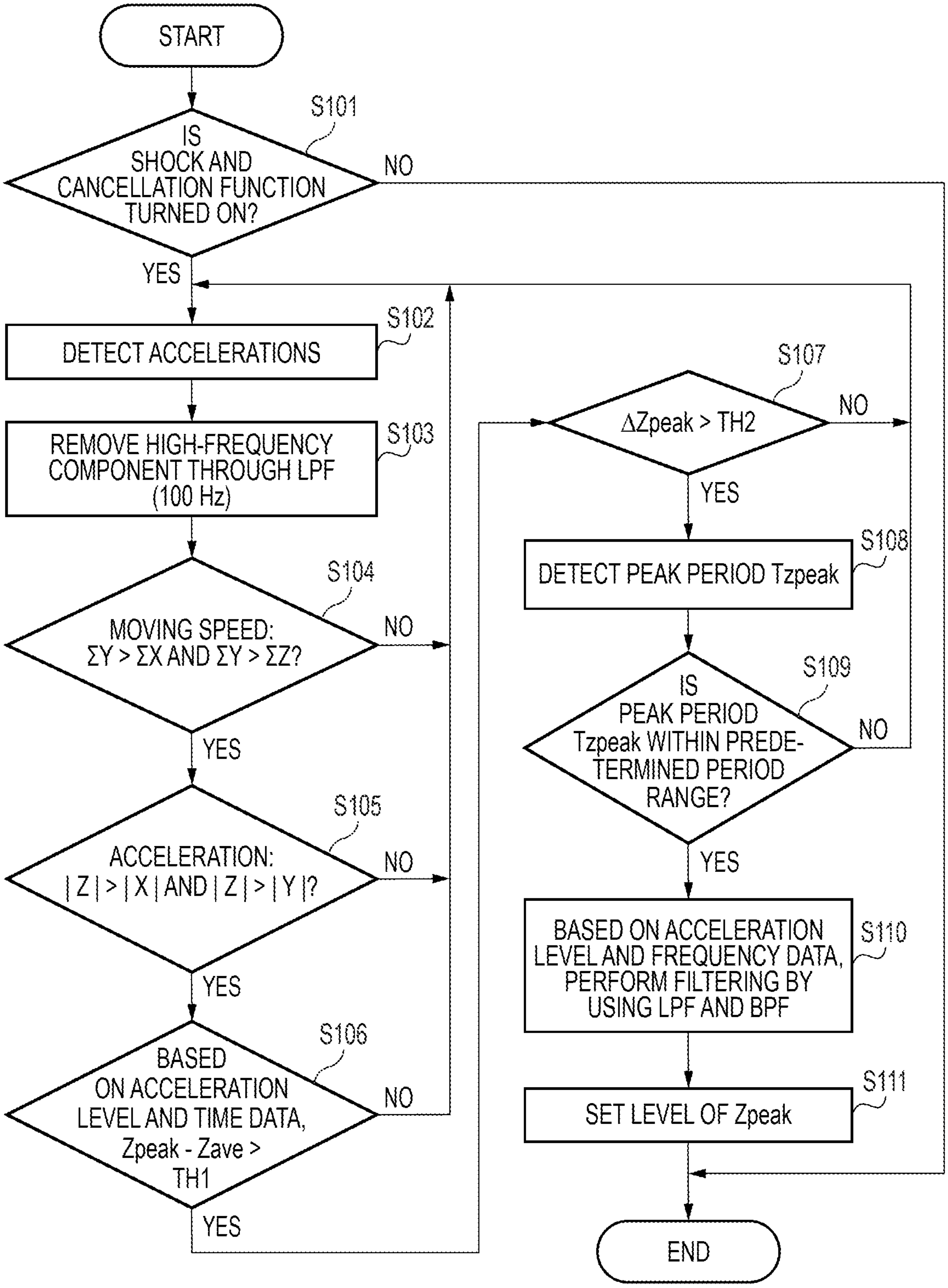
FIG. 5 is a flowchart exemplifying a processing flow of the circuit board shown in FIG. 4.
Figure 6:
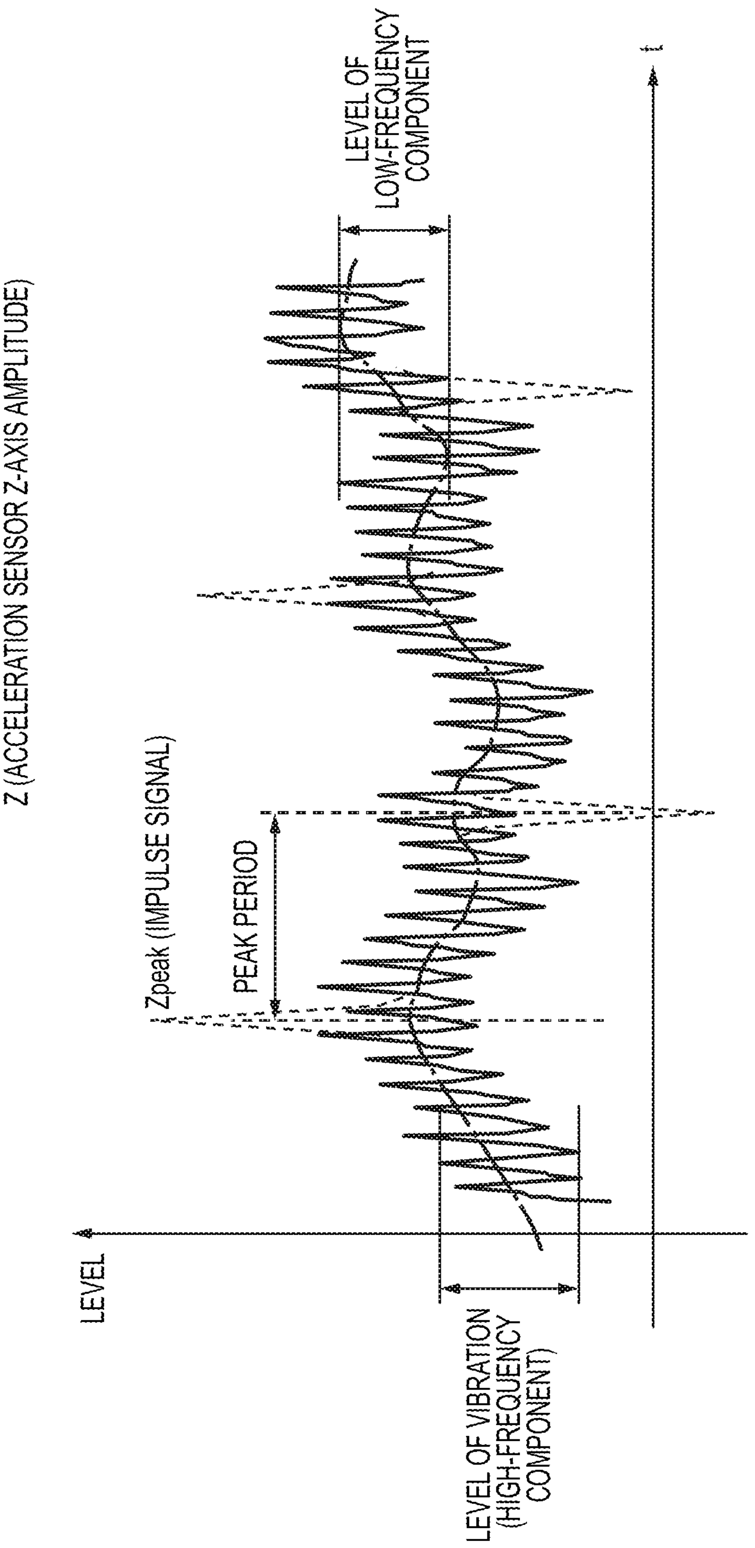
FIG. 6 is a graph showing a temporal change in an acceleration signal of a Z component detected by an acceleration sensor shown in FIG. 2.
Figure 7:
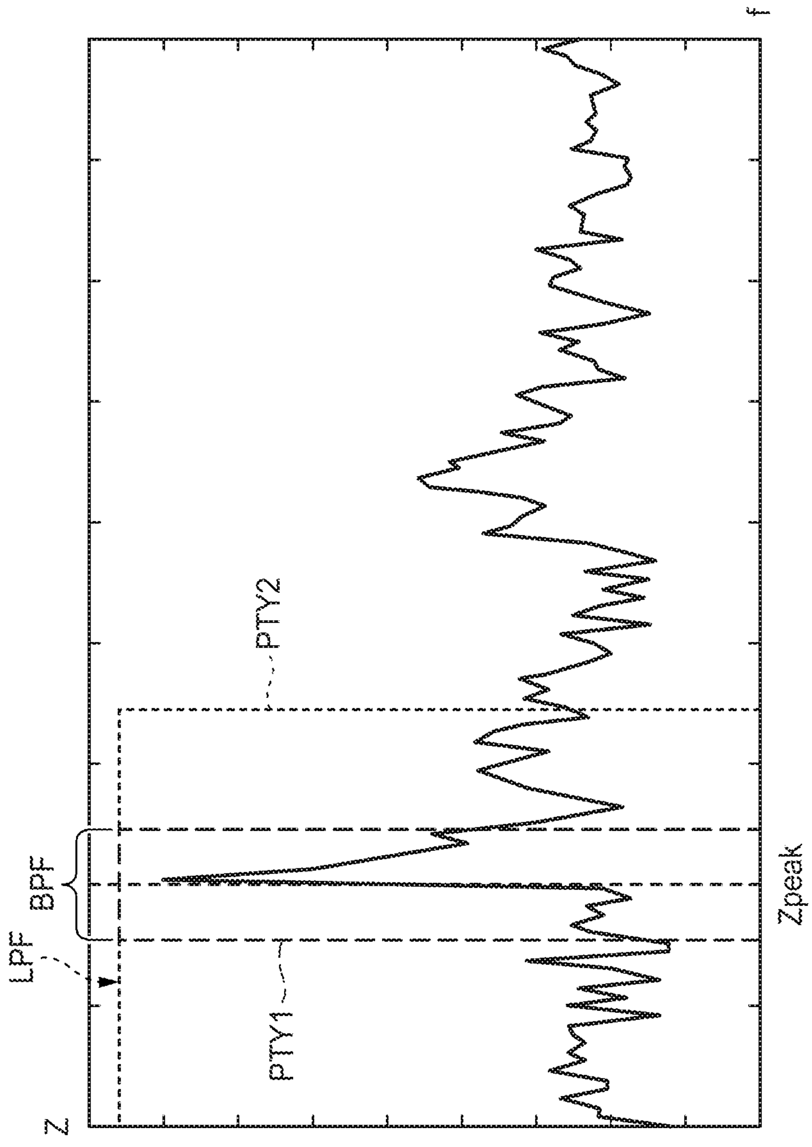
FIG. 7 is a graph showing characteristics of a frequency and a level of the acceleration signal of the Z component.

Next, a processing flow of the circuit board 20 according to the present embodiment will be described with reference to FIGS. 5 to 7. FIG. 5 is a flowchart exemplifying the processing flow of the circuit board 20 shown in FIG. 4. FIG. 6 is a graph showing a temporal change in an acceleration signal of the Z component detected by the acceleration sensor 11 shown in FIG. 2. FIG. 7 is a graph showing characteristics of a frequency and a level of the acceleration signal of the Z component.

As shown in FIG. 5, the circuit board 20 of the headphone 1 determines whether the shock and cancellation function of the headphone 1 is turned on based on an input operation of a user operation to the application of the smartphone P of the user U through wireless communication (S101). When it is determined that the shock and cancellation function is not turned on in a determination result thereof (NO in S101), the processing flow ends.

In contrast, when it is determined that the shock and cancellation function of the headphone 1 is turned on (YES in S101), the acceleration sensor 11 of the headphone 1 periodically detects vibrations (accelerations) of the user U in the three axial directions (see FIG. 3) including the Z-axis direction, the Y-axis direction, and the X-axis direction with the respective components in a state where the user U wears the headphone 1.

Here, as shown in FIG. 6, in the Z-axis direction, the acceleration sensor 11 basically detects a vibration signal in which an amplitude level of a high frequency component is superimposed on an amplitude level of a low frequency component. When the user U plays sports (for example, performs a motion such as jogging, or marathon) while wearing the headphone 1, since jogging or the like is a periodic motion in which both feet are alternately landed, the acceleration sensor 11 also detects a periodic impact due to the alternate landing of both feet (Zpeak in FIG. 6). The periodic impact is detected as a peak (impulse signal) of a vibration signal corresponding to a movement of the user U in the motion such as jogging. In the present embodiment, as will be described later, the vibration sound processing unit 32 detects the peak of the vibration sound in the Z-axis direction as a signal corresponding to the movement of the user U.

Referring back to FIG. 5 again, the description will be continued. As shown in FIG. 5, the LPF unit 31 receives a vibration signal (vibration sound) detected by the acceleration sensor 11, sets, for example, 100 Hz as a cutoff frequency, and removes a high-frequency component from each of an X-axis component, a Y-axis component, and a Z-axis component of the vibration signal. With the removal, the LPF unit 31 allows only the low-frequency component to pass through each of the three axis components (S103).

The vibration sound processing unit 32 integrates vibration signals of these three axis components to calculate an integrated value ΣX of the X-axis component, an integrated value ΣY of the Y-axis component, and an integrated value ΣZ of the Z-axis component. Based on a calculation result thereof, the vibration sound processing unit 32 determines whether the integrated value ΣY of the Y-axis component is larger than the integrated value ΣX of the X-axis component and the integrated value ΣY of the Y-axis component is larger than the integrated value ΣZ of the Z-axis component (S104). Since these integrated values ΣX, ΣY, and ΣZ are integrated values of the acceleration that is the vibration sound, the integrated values are values corresponding to a moving speed. In other words, the determination (S104) is equivalent to determining whether the moving speed in the Y-axis direction is higher than both the moving speed in the X-axis direction and the moving speed in the Z-axis direction, and it is possible to estimate whether the user U is in a motion such as jogging as a physical phenomenon. When it is determined that both the moving speeds are not high in a determination result thereof, the processing flow returns to step S102.

In contrast, when it is determined that the moving speeds are high in the determination result, the vibration sound processing unit 32 estimates that the user U is in the motion such as jogging, and determines whether an absolute value |Z| of an acceleration (vibration signal) in the Z-axis direction is larger than an absolute value |X| of an acceleration in the X-axis direction and an absolute value |Z| of an acceleration in the Z-axis direction is larger than an absolute value |Y| of an acceleration in the Y-axis direction. In the determination, presence or absence of an impact in the Z-axis direction due to the motion such as jogging is detected. That is, since in the motion such as jogging, both feet alternately land due to the traveling and push back the ground due to a reaction thereof, an impulse vibration signal is generated in the Z-axis direction. Accordingly, an absolute amount of the acceleration is larger in the Z-axis direction than in the X-axis direction and the Y-axis direction. The vibration sound processing unit 32 can estimate generation of the impact in accordance with a movement of the user U in the motion, such as jogging, by determining the magnitude.

When it is determined that the absolute value |Z| of the acceleration in the Z-axis direction is smaller than the absolute value |X| of the acceleration in the X-axis direction or the absolute value |Z| of the acceleration in the Z-axis direction is smaller than the absolute value |Y| of the acceleration in the Y-axis direction (NO in S105), the processing flow returns to step S102.

In contrast, when it is determined that the absolute value |Z| of the acceleration in the Z-axis direction is larger than any of the absolute values |X| and |Y|, the vibration sound processing unit 32 detects the peak Zpeak of the vibration signal (vibration sound) in the Z-axis direction based on time characteristics of the acceleration level (see FIG. 6).

That is, in the present embodiment, when it is determined that the moving speed in the Y-axis direction is higher than the moving speed in the X-axis direction and the moving speed in the Z-axis direction and the absolute value of the acceleration in the Z-axis direction is larger than the absolute value of the acceleration in the Y-axis direction and the absolute value of the acceleration in the X-axis direction, the vibration sound processing unit 32 detects the peak Zpeak of the vibration signal (S104 and S105).

After detecting the peak of the vibration sound, the vibration sound processing unit 32 calculates a difference between the peak (peak level) Zpeak in the Z-axis direction and an average value Zave of the acceleration in the Z-axis direction in a predetermined period. Then, the vibration sound processing unit 32 determines whether the difference is larger than a first threshold TH1 (in the present embodiment, for example, set to 6 dB, an example of a first predetermined value). When it is determined that the difference is equal to or smaller than the first threshold TH1 in a determination result thereof (NO in S106), the processing flow returns to step S102.

In contrast, when it is determined that the difference is large (YES in S106), the vibration sound processing unit 32 differentiates the peak Zpeak of the detected vibration sound, and determines whether a differential result thereof (differential value ΔZpeak) is larger than a second threshold TH2 (in the present embodiment, for example, set to 3 dB, an example of a second predetermined value) (S107). When it is determined that the differential result is equal to or smaller than the second threshold TH2 in the determination result (NO in S107), the processing flow returns to step S102. In the present embodiment, the first threshold TH1 and the second threshold TH2 are set and stored in advance in, for example, the ROM 35, but may be provided so as to be variably optimized using learning data (described later) generated by a machine learning method such as deep learning. Since the first threshold TH1 and the second threshold TH2 can be variably adjusted, accuracy of estimating generation of the impact in accordance with the movement of the user U in the motion is further improved.

In contrast, when it is determined that the differential value ΔZpeak is larger than the second threshold TH2 (YES in S107), the BPF and gain setting unit 33 detects a peak period Tzpeak of the vibration sound by specifying a detection time of the peak Zpeak of the vibration sound on an assumption that a time difference at which the peak Zpeak of the vibration sound is detected is periodic.

That is, when it is determined that a difference between the peak Zpeak in the Z-axis direction during a predetermined period and an average value Zave of the vibration sound during the predetermined period is larger than the first threshold TH1 and the differential value ΔZpeak (an example of a change amount) of the peak Zpeak of the vibration sound during the predetermined period is larger than the second threshold TH2, the BPF and gain setting unit 33 specifies a detection time of the peak of the vibration sound (S106 to S108).

After specifying the detection time of the peak of the vibration sound and detecting the peak period Tzpeak, the BPF and gain setting unit 33 determines whether the peak period Tzpeak is within a predetermined period range (for example, 90 to 120 Hz in the present embodiment) (S109). The predetermined period range is, for example, set to correspond to a period range corresponding to a traveling motion such as jogging of the user U, and it is possible to more accurately estimate whether the user U performs the traveling motion by the determination. When it is determined that the peak period Tzpeak is not within the predetermined period range in the determination result (NO in S109), that is, when it is finally estimated that the user U is not in a traveling motion state, the processing flow returns to step S102.

In contrast, when it is determined that the peak period Tzpeak is within the predetermined period range (YES in S109), that is, when it is finally estimated that the user U is in the traveling motion state, as shown in FIG. 7, the BPF and gain setting unit 33 performs a low pass filter processing on the vibration sound in terms of frequency characteristics of a level related to the acceleration, removes the high-frequency component, and only allows the low-frequency component to pass therethrough. Further, the BPF and gain setting unit 33 performs a band pass filter processing on a range including the peak period Tzpeak (S110).

Referring back to FIG. 5 again, the description will be continued. As shown in FIG. 5, the BPF and gain setting unit 33 detects and sets a level of the peak Zpeak of the vibration sound based on the band pass filter processing (S111). Further, based on the set level of the peak Zpeak, the BPF and gain setting unit 33 sets a gain of the cancellation signal in the Z-axis direction, which is suppressed from the acoustic signal acoustically output from the driver 10 (S111). Based on the setting of the gain of the peak Zpeak of the vibration sound, the ANC unit 42 generates a cancellation signal for suppression from the acoustic signal acoustically output from the driver 10, and transmits the cancellation signal to the addition unit 43.

Similarly, in the present embodiment, the predetermined period range described above is also set and stored in advance in, for example, the ROM 35, but may be provided so as to be variably adjustable by using the learning data (described later) generated by a machine learning method such as deep learning. Since the predetermined period range can be variably adjusted, determination accuracy of whether the user U is in the traveling motion state is further improved.

In this way, when determining that the time difference at which the peak of the vibration sound is detected is periodic, the BPF and gain setting unit 33 sets the gain of the cancellation signal to be suppressed from the acoustic signal acoustically output from the driver 10 based on the peak Zpeak of the vibration sound. Therefore, in the present embodiment, it is possible to efficiently reduce noise such as the vibration sound generated in accordance with the movement of the user U in the motion such as jogging, and to prevent deterioration in sound quality of an acoustically output sound.

As described above, according to the headphone 1 (an example of the acoustic apparatus) of the first embodiment, the headphone 1 (an example of the acoustic apparatus) worn by the user U who is in a motion includes: the driver 10 (an example of the sound-emitting unit) that acoustically outputs the sound signal; one acceleration sensor 11 (an example of the sensor) that periodically detects accelerations of the user U in the three directions including the front-rear direction, the left-right direction, and the upper-lower direction; the vibration sound processing unit 32 (an example of the vibration sound peak detection unit) that detects the peak Zpeak of the vibration sound based on the movement of the user U when the detection values of the accelerations in the front-rear direction, the left-right direction, and the upper-lower direction satisfy the predetermined condition; and the BPF and gain setting unit 33 (an example of the signal processing unit) that determines whether the time difference at which the peak Zpeak of the vibration sound is detected is periodic. When determining that the time difference at which the peak Zpeak of the vibration sound is detected is periodic, the BPF and gain setting unit 33 sets the gain of the cancellation signal to be suppressed from the sound signal acoustically output from the driver 10 based on the peak Zpeak of the vibration sound.

According to the acoustic control method of the first embodiment, the acoustic control method for the headphone 1 (an example of the apparatus) worn by the user U who is in the motion, includes: a step of acoustically outputting the sound signal (sound-emitting step); a step of periodically detecting the accelerations of the user U in the three directions including the front-rear direction, the left-right direction, and the upper-lower direction at at least one position (detection step); a step of detecting the peak Zpeak of the vibration sound based on the movement of the user U when the detection values of the accelerations in the front-rear direction, the left-right direction, and the upper-lower direction satisfy a predetermined condition (vibration sound peak detection step); and a step of determining whether the time difference at which the peak Zpeak of the vibration sound is detected is periodic (signal processing step). In the step of the signal processing step, when it is determined that the time difference at which the peak Zpeak of the vibration sound is detected is periodic, the gain of the cancellation signal to be suppressed from the sound signal acoustically output in the sound-emitting step is set based on the peak Zpeak of the vibration sound.

When the user U plays sports, for example, performs the motion such as jogging or marathon while wearing the headphone 1, since the jogging or the like is a periodic motion in which both feet are alternately landed, the acceleration sensor 11 also detects the periodic impact due to the alternate landing of both feet.

In the first embodiment, when determining that the time difference at which the peak Zpeak of the vibration sound is detected is periodic, the BPF and gain setting unit 33 estimates that the periodic impact is generated due to the motion such as jogging, and sets the gain of the cancellation signal that suppresses the generation of the periodic impact. Then, based on the setting of the gain, the ANC unit 42 generates the cancellation signal for suppression from the acoustic signal acoustically output from the driver 10, and outputs the cancellation signal to the driver 10 through the addition unit 43 and the digital-to-analog conversion unit 44. Therefore, it is possible to efficiently reduce noise such as the vibration sound generated in accordance with the movement of the user U in the motion, and to prevent deterioration in the sound quality of the acoustically output sound.

According to the headphone 1 (an example of the acoustic apparatus) of the first embodiment, the vibration sound processing unit 32 (an example of the vibration sound peak detection unit) detects the peak Zpeak of the vibration sound when it is determined that the speed in the front-rear direction is higher than the speed in the left-right direction and the speed in the upper-lower direction and the absolute value of the acceleration in the upper-lower direction is larger than the absolute value of the acceleration in the front-rear direction and the absolute value of the acceleration in the left-right direction as the predetermined condition. Therefore, the vibration sound processing unit 32 can accurately estimate that the periodic impact is generated due to the motion such as jogging, and can prevent an accidental operation of the noise reduction function under a situation other than sports such as jogging.

According to the headphone 1 (an example of the acoustic apparatus) of the first embodiment, the BPF and gain setting unit 33 (an example of the signal processing unit) specifies the detection time Tzpeak of the peak Zpeak of the vibration sound when it is determined that the difference between the peak Zpeak of the vibration sound during the predetermined period and the average value Zave of the vibration sound during the predetermined period is larger than the first threshold TH1 (an example of the first predetermined value) and the differential value ΔZpeak (an example of the change amount) of the peak Zpeak of the vibration sound during the predetermined period is larger than the second threshold TH2 (an example of the second predetermined value). Therefore, it is possible to prevent the BPF and gain setting unit 33 from excessively detecting the detection time of the peak Zpeak of the vibration sound and prevent the noise reduction function from excessively operating. Accordingly, it is possible to reduce noise in a range that becomes a trouble to the user U with an appropriate sensitivity.

Second Embodiment

Figure 8:
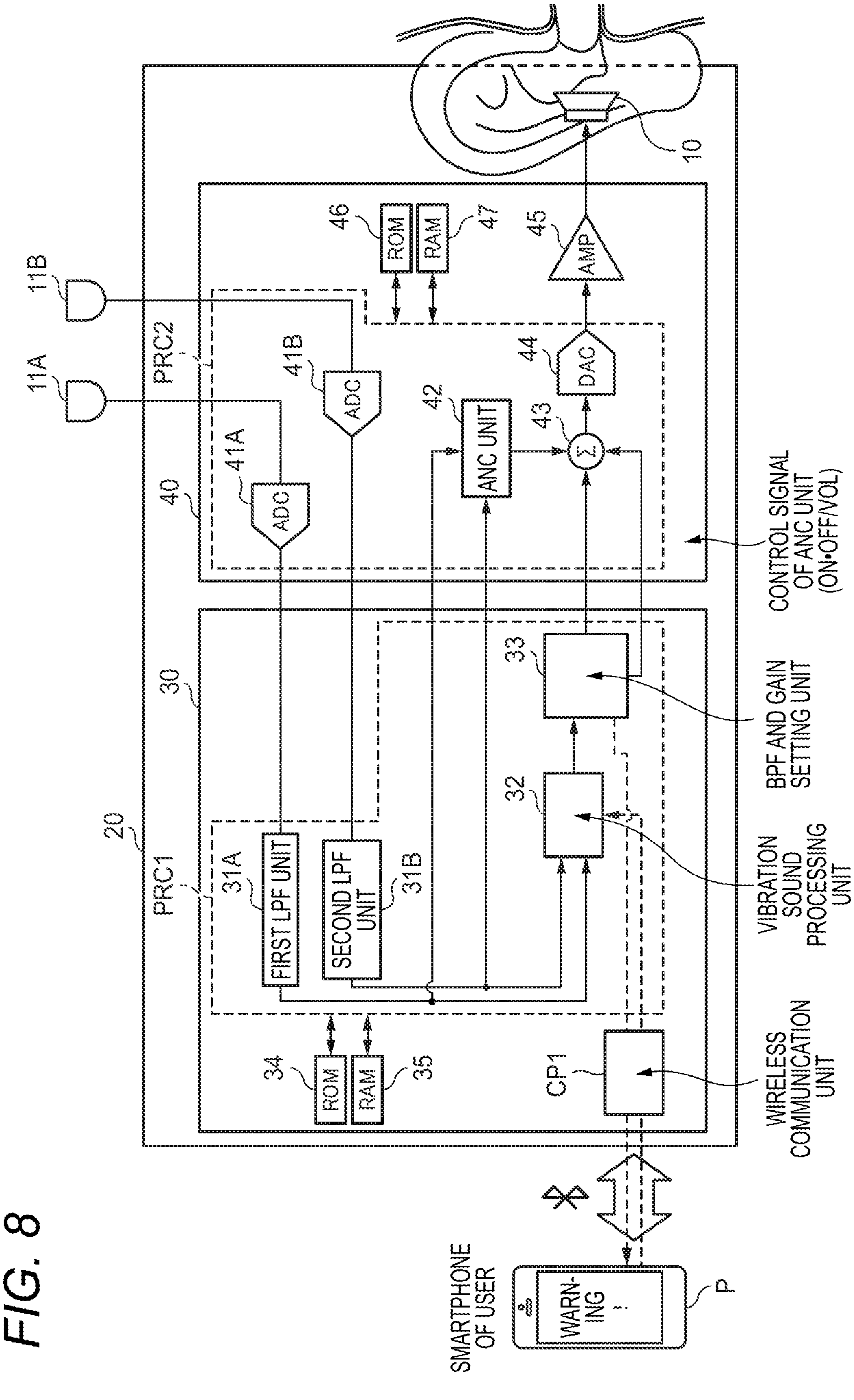
FIG. 8 is a functional block diagram exemplifying a processing of a circuit board of a second embodiment.

A second embodiment according to the present disclosure will be described with reference to FIGS. 8 and 9. Since the description of the same or equivalent parts as those of the first embodiment described above is repeated, the same reference numerals are given to the drawings, and the description thereof may be omitted or simplified.

[Configuration of Circuit Board]

A configuration of the circuit board 20 according to the present embodiment will be described with reference to FIG. 8. FIG. 8 is a functional block diagram exemplifying a processing of the circuit board 20 of the present embodiment. In the description of FIG. 8, the same reference numerals are given to repeated description of the configurations as in FIG. 4, the description thereof will be simplified or omitted, and different contents will be described.

In the first embodiment described above, one acceleration sensor 11 is embedded in only one of the pair of left and right main body portions 3, but in the present embodiment, the acceleration sensor 11 is embedded in each of the pair of left and right main body portions 3 (see FIG. 2). That is, the acceleration sensor 11 of the present embodiment includes a pair of a left acceleration sensor 11B (an example of a first sensor) disposed around a left ear of the user U and a right acceleration sensor 11A (an example of a second sensor) disposed around a right ear of the user U. The left acceleration sensor 11B and the right acceleration sensor 11A are arranged apart from each other in the X-axis direction, and are arranged so as to be able to acquire accelerations of two left and right channels.

Then, corresponding to the embedding of the left acceleration sensor 11B and the right acceleration sensor 11A, a pair of first analog-to-digital conversion unit 41A and second analog-to-digital conversion unit 41B are provided as the analog-to-digital conversion unit 41 in the second circuit unit 40 of the circuit board 20. The first analog-to-digital conversion unit 41A is electrically connected to the left acceleration sensor 11A, and the second analog-to-digital conversion unit 41B is electrically connected to the right acceleration sensor 11B. Analog signals of vibration signals (accelerations) of the two left and right channels are converted into digital signals.

The first circuit unit 30 of the circuit board 20 is provided with a pair of a first LPF unit 31A and a second LPF unit 31B as the LPF unit 31. The first LPF unit 31A receives a vibration signal transmitted from the first analog-to-digital conversion unit 41A, only allows a low-frequency component of the vibration signal to pass, and transmits the vibration signal to the vibration sound processing unit 32 and the ANC unit 42. Similarly, the second LPF unit 31B receives a vibration signal transmitted from the second analog-to-digital conversion unit 41B, only allows a low-frequency component of the vibration signal to pass, and transmits the vibration signal to the vibration sound processing unit 32 and the ANC unit 42. In this way, the vibration sound processing unit 32 and the ANC unit 42 receive the vibration signals of the two left and right channels.

The vibration sound processing unit 32 receives the vibration signals of the two left and right channels, and detects a peak (Zpeak (L) described later) of a vibration sound (an example of a first vibration sound) detected on the left side based on the vibration signal (an example of a first detection value) of the channel on the left side detected by the left acceleration sensor 11B. Further, at the same time, the vibration sound processing unit 32 also detects a peak (Zpeak (R) described later) of the vibration sound (an example of a second vibration sound) detected on the right side based on the vibration signal (second detection value) of the channel on the right side detected by the right acceleration sensor 11A. Other configurations are similar to those of the circuit board 20 of the first embodiment.

[Processing Flow of Circuit Board]

Next, a processing flow of the circuit board 20 according to the present embodiment will be described with reference to FIG. 9. FIG. 9 is a flowchart exemplifying the processing flow of the circuit board 20 shown in FIG. 8.

Figure 9:
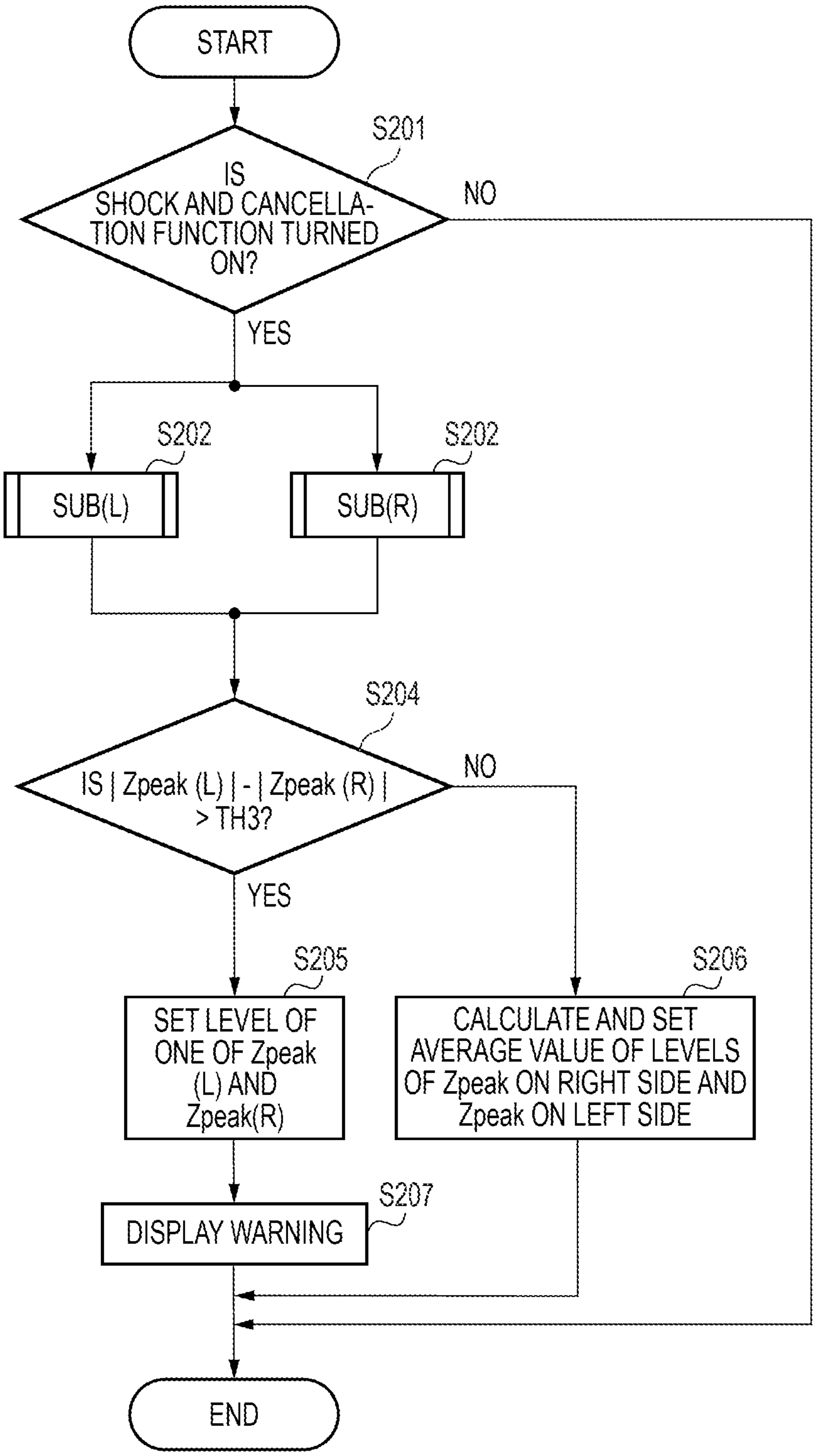
FIG. 9 is a flowchart exemplifying a processing flow of the circuit board shown in FIG. 8.

As shown in FIG. 9, the circuit board 20 of the headphone 1 determines whether a shock and cancellation function is turned on in an application of the smartphone P of the user U through wireless communication (S201). When it is determined that the shock and cancellation function is not turned on in a determination result thereof (NO in S201), the processing flow ends. In contrast, when it is determined that the shock and cancellation function is turned on (YES in S201), the processing flow proceeds to steps S202 and S203.

Steps S202 and S203 are sub-processings, and the circuit board 20 executes processings similar to those of steps S102 to S111 in the above-described first embodiment on the vibration signals of the two left and right channels detected by the left acceleration sensor 11B and the right acceleration sensor 11A by the two left and right channels.

That is, step S202 is a sub-processing for a signal of the channel on the left side detected by the left acceleration sensor 11B. In step S202, the BPF and gain setting unit 33 finally derives a gain (an example of a first gain) (hereinafter, also referred to as "Zpeak (L)") of the channel on the left side based on a detection value of a peak of the vibration sound (an example of the first vibration sound) detected on the left side for the channel on the left side.

Step S203 is a sub-processing for a signal of the channel on the right side detected by the right acceleration sensor 11A. Similarly, also in step S203, the BPF and gain setting unit 33 finally derives a gain (an example of a second gain) (hereinafter, also referred to as "Zpeak (R)") of the channel on the right side based on a detection value of a peak of a vibration sound (an example of the first vibration sound) detected on the right side for the channel on the right side. Steps S202 and S203 are executed in parallel at the same time, and thereafter, the processing flow proceeds to step S204.

The BPF and gain setting unit 33 determines whether an absolute value of a difference between the peak Zpeak (L) of the channel on the left side and the peak Zpeak (R) of the channel on the right side is larger than a third threshold TH3 (an example of a predetermined value) (S204). When it is determined that the absolute value is larger than the third threshold TH3 in a determination result thereof (YES in S204), any one of Zpeak (L) and Zpeak (R) is set as a gain of a cancellation signal. Based on the gain setting, the ANC unit 42 generates a cancellation signal for suppression from an acoustic signal acoustically output from the driver 10, and transmits the cancellation signal to the addition unit 43 (S205).

At this time, it is determined that the gain of the vibration signal detected by one of the left acceleration sensor 11B and the right acceleration sensor 11A is excessively high. Therefore, it is possible to estimate that the user U is in an abnormal state where the user U wobbles in a lateral direction. In order to notify the user U of the abnormal state to take appropriate measures, the BPF and gain setting unit 33 displays a warning message indicating that the user U wobbles on a display unit of the smartphone P possessed by the user U (S207).

In contrast, when it is determined that the absolute value of the difference between the peak Zpeak (L) of the channel on the left side and the peak Zpeak (R) of the channel on the right side is not larger than the third threshold TH3 (NO in S204), that is, when it is determined that the absolute value of the difference between the peak Zpeak (L) of the channel on the left side and the peak Zpeak (R) of the channel on the right side is equal to or smaller than the third threshold TH3, the BPF and gain setting unit 33 sets an average value of Zpeak (L) and Zpeak (R) as a gain of the cancellation signal. Based on the gain setting, the ANC unit 42 generates a cancellation signal for suppression from the acoustic signal acoustically output from the driver 10, and transmits the cancellation signal to the addition unit 43 (S206). Similarly, also in the present embodiment, the third threshold TH3 is set and stored in advance in, for example, the ROM 35, but may be provided so as to be variably optimized using learning data (described later) generated by a machine learning method such as deep learning. Since the third threshold TH3 can be variably adjusted, accuracy of estimating that the user U is in an abnormal state where the user U wobbles in the lateral direction is further improved.

As described above, according to the headphone 1 (an example of the acoustic apparatus) of the second embodiment, the acceleration sensor 11 (an example of the sensor) includes the left acceleration sensor 11B (an example of the first sensor) disposed around the left ear of the user U, and the right acceleration sensor 11A (an example of the second sensor) disposed around the right ear of the user U. Further, the vibration sound processing unit 32 (an example of the vibration sound peak detection unit) detects the peak of the vibration sound (an example of the first vibration sound) detected on the left side based on the vibration signal (an example of the first detection value) of the channel on the left side detected by the left acceleration sensor 11B, and detects the peak of the vibration sound (an example of the second vibration sound) detected on the right side based on the vibration signal (an example of the second detection value) of the channel on the right side detected by the right acceleration sensor 11A. Further, the BPF and gain setting unit 33 (an example of the signal processing unit) derives the peak Zpeak (L) (an example of the first gain) of the channel on the left side based on the detection value of the peak of the vibration sound (an example of the first vibration sound) detected on the left side, and derives the peak Zpeak (R) (an example of the second gain) of the channel on the right side based on the detection value of the peak of the vibration sound (an example of the first vibration sound) detected on the right side, and when it is determined that the difference between the peak Zpeak (L) of the channel on the left side and the peak Zpeak (R) of the channel on the right side is equal to or smaller than the third threshold TH3 (an example of the predetermined value), sets the average value of the peak Zpeak (L) of the channel on the left side and the peak Zpeak (R) of the channel on the right side as the gain of the cancellation signal.

Therefore, the left acceleration sensor 11B and the right acceleration sensor 11A arranged apart from each other in the lateral direction (X-axis direction) of the user U can acquire the signals of the two left and right channels, and the gain of the cancellation signal can be set based on the signals of the two left and right channels. Accordingly, noise such as the vibration sound generated in accordance with the movement of the user U in the motion can be accurately reduced.

According to the headphone 1 (an example of the acoustic apparatus) of the second embodiment, the acceleration sensor 11 (an example of the sensor) includes the left acceleration sensor 11B (an example of the first sensor) disposed around the left ear of the user U, and the right acceleration sensor 11A (an example of the second sensor) disposed around the right ear of the user U. Further, the vibration sound processing unit 32 (an example of the vibration sound peak detection unit) detects the peak of the vibration sound (an example of the first vibration sound) detected on the left side based on the vibration signal (an example of the first detection value) of the channel on the left side detected by the left acceleration sensor 11B, and detects the peak of the vibration sound (an example of the second vibration sound) detected on the right side based on the vibration signal (an example of the second detection value) of the channel on the right side detected by the right acceleration sensor 11A. Further, the BPF and gain setting unit 33 (an example of the signal processing unit) derives the peak Zpeak (L) (an example of the first gain) of the channel on the left side based on the detection value of the peak of the vibration sound (an example of the first vibration sound) detected on the left side, and derives the peak Zpeak (R) (an example of the second gain) of the channel on the right side based on the detection value of the peak of the vibration sound (an example of the first vibration sound) detected on the right side, and when it is determined that the difference between the peak Zpeak (L) of the channel on the left side and the peak Zpeak (R) of the channel on the right side is larger than the third threshold TH3 (an example of the predetermined value), sets one of the peak Zpeak (L) of the channel on the left side and the peak Zpeak (R) of the channel on the right side as the gain of the cancellation signal.

Therefore, even when it is determined that a level of the vibration signal detected by one of the left acceleration sensor 11B and the right acceleration sensor 11A is excessively high, the noise such as the vibration sound generated in accordance with the movement of the user U in the motion can be reduced without any trouble.

According to the headphone 1 (an example of the acoustic apparatus) of the second embodiment, the BPF and gain setting unit 33 (an example of the signal processing unit) displays the warning message indicating that the user U wobbles on the smartphone P (an example of the terminal) possessed by the user U.

When it is determined that the level of the vibration signal detected by one of the left acceleration sensor 11B and the right acceleration sensor 11A is excessively high, it is possible to estimate that the user U is in a state of wobbling. Therefore, by displaying the warning message indicating that the user U wobbles on the display unit of the smartphone P possessed by the user U, it is possible to notify the user U of the abnormal state to take appropriate measures.

Third Embodiment

A third embodiment according to the present disclosure will be described with reference to FIGS. 10 and 11. Since the description of the same or equivalent parts as those of the first embodiment and the second embodiment described above is repeated, the same reference numerals are given to the drawings, and the description thereof may be omitted or simplified.

[Configuration of Circuit Board]

A configuration of the circuit board 20 according to the present embodiment will be described with reference to FIG. 10. FIG. 10 is a functional block diagram exemplifying a processing of the circuit board 20 of the present embodiment. In the description of FIG. 10, the same reference numerals are given to repeated description of the configurations as in FIG. 4, the description thereof will be simplified or omitted, and different contents will be described.

Figure 10:
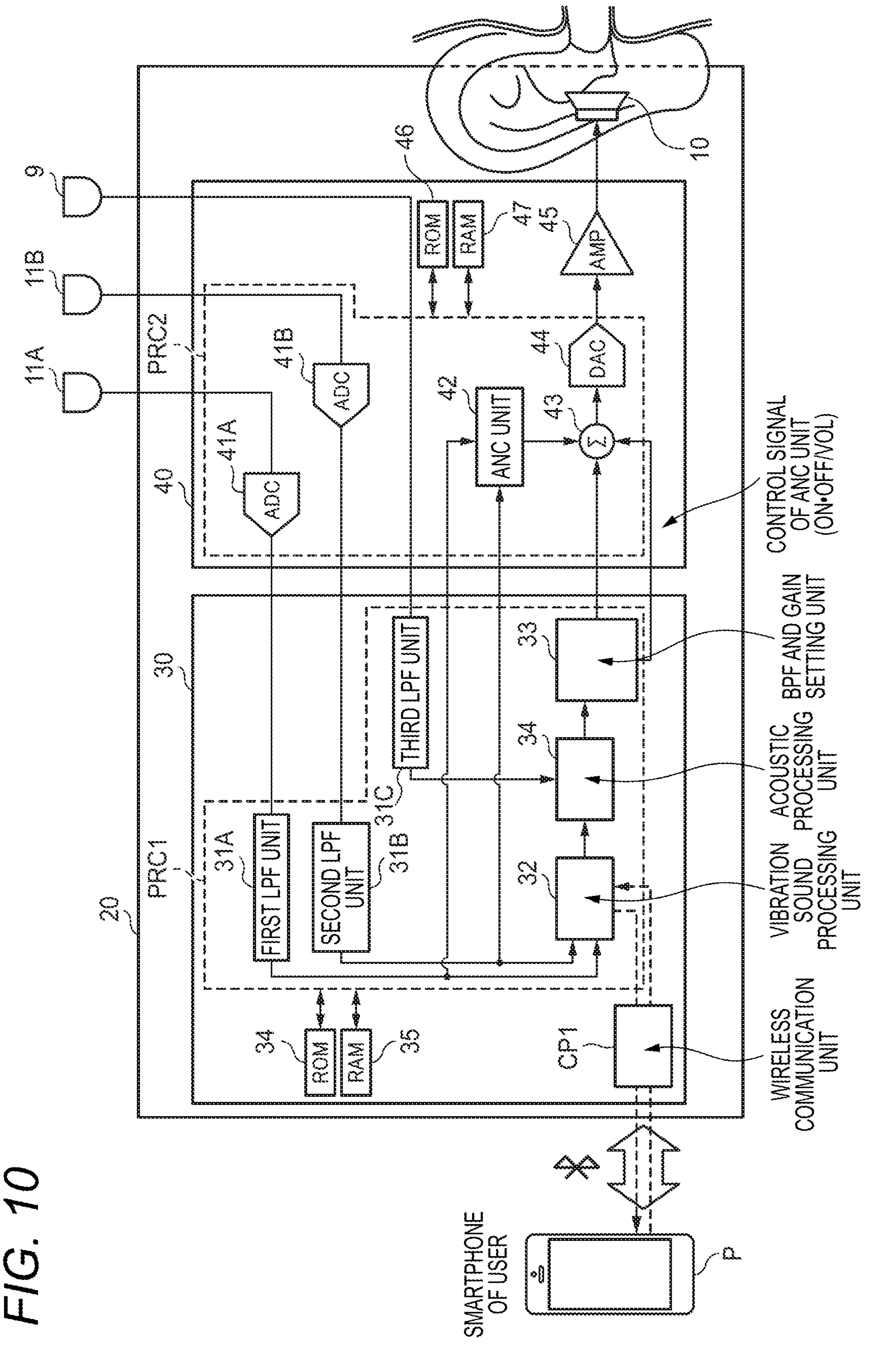
FIG. 10 is a functional block diagram exemplifying a processing of a circuit board of a third embodiment.

As shown in FIG. 10, in the present embodiment, a case where the headphone 1 is used not for a music playback application but for a telephone application is described as an example, and a third LPF unit 31C and an acoustic processing unit 34 (an example of an utterance peak detection unit) are further provided on the circuit board 20 of the present embodiment as compared with the configuration (see FIG. 8) of the circuit board 20 of the second embodiment described above.

As described above, the bone-conduction sensor 9 detects utterance of the user U, and a detection signal thereof is transmitted to the third LPF unit 31C as an utterance signal V. The third LPF unit 31C receives the detection signal from the bone-conduction sensor 9, only allows a low-frequency component of the detection signal to pass, and transmits the detection signal to the acoustic processing unit 34.

In the present embodiment, the acoustic processing unit 34 receives the detection signal transmitted from the bone-conduction sensor 9 through the third LPF unit 31C, and specifies a detection time of a peak of an acoustic signal detected by the bone-conduction sensor 9 when a predetermined condition is satisfied based on the reception result. The acoustic processing unit 34 transmits a specifying result thereof to the BPF and gain setting unit 33.

In the present embodiment, the acoustic processing unit 34 is provided so as to be able to also receive the acoustic signal from the vibration sound processing unit 32, that is, the vibration sound processing unit 32 is not directly connected to the BPF and gain setting unit 33, but is indirectly connected to the BPF and gain setting unit 33 via the acoustic processing unit 34. Other configurations are similar to those of the circuit board 20 of the second embodiment.

[Processing Flow of Circuit Board]

Next, a processing flow of the circuit board 20 according to the present embodiment will be described with reference to FIG. 11. FIG. 11 is a flowchart exemplifying the processing flow of the circuit board 20 shown in FIG. 10.

Figure 11:
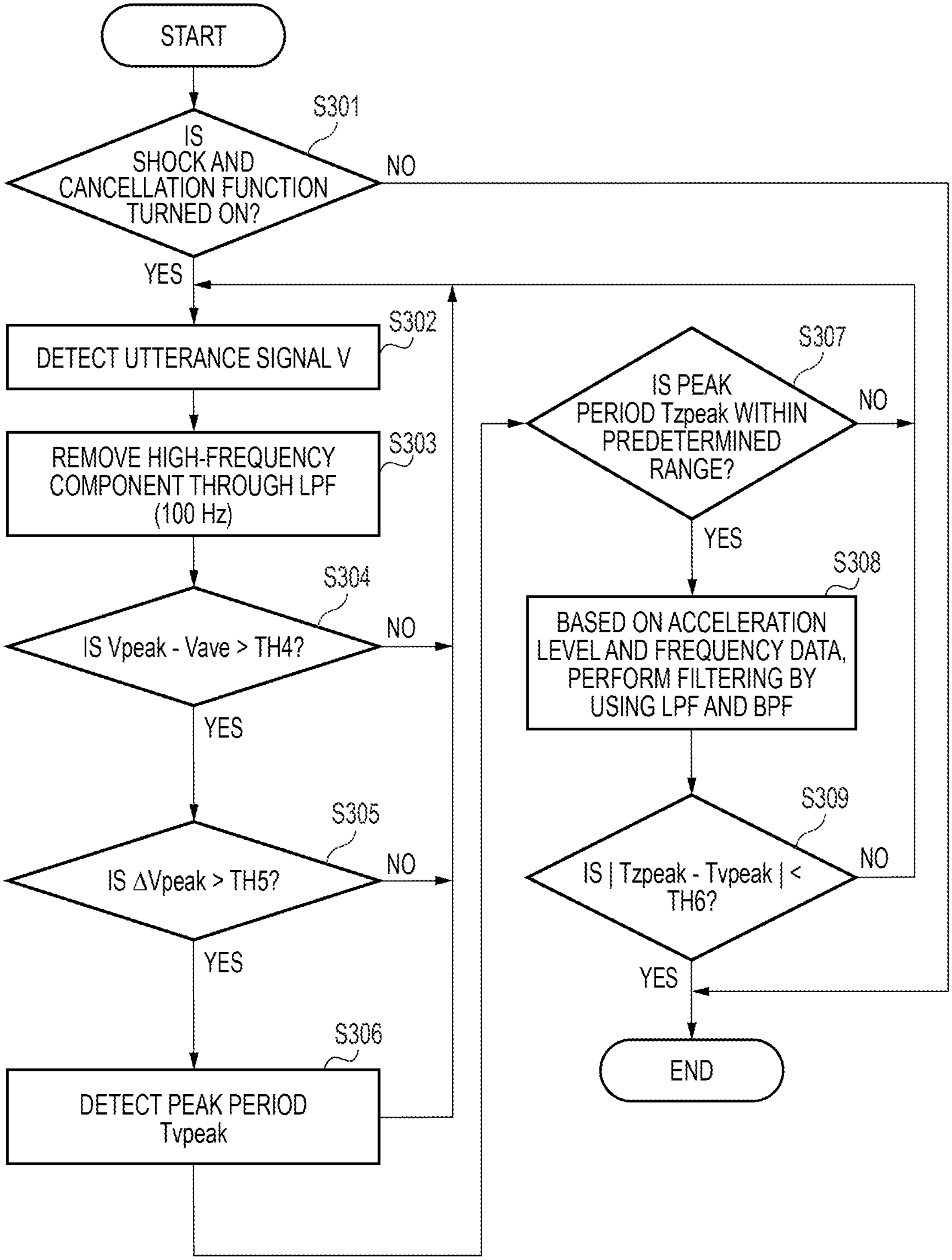
FIG. 11 is a flowchart exemplifying a processing flow of the circuit board shown in FIG. 10.

As shown in FIG. 11, the circuit board 20 of the headphone 1 determines whether a shock and cancellation function is turned on in an application of the smartphone P of the user U through wireless communication (S301). When it is determined that the shock and cancellation function is not turned on in a determination result thereof (NO in S301), the processing flow ends. In contrast, when it is determined that the shock and cancellation function is turned on (YES in S301), the bone-conduction sensor 9 detects utterance of the user U, and transmits a detection result thereof to the third LPF unit 31C as the utterance signal V (S302).

The third LPF unit 31C receives the utterance signal V (acoustic signal) detected by the bone-conduction sensor 9, sets, for example, 100 Hz as a cutoff frequency, and removes a high-frequency component of the utterance signal V. With the removal, the third LPF unit 31C only allows a low-frequency component of the utterance signal V to pass (S303).

The acoustic processing unit 34 detects a peak of the utterance signal V, and then calculates a difference between a peak Vpeak of the utterance signal V (an example of an acoustic signal) during a predetermined period detected by the bone-conduction sensor 9 and an average value Vave of the utterance signal V during the predetermined period. The acoustic processing unit 34 determines whether the difference is larger than a fourth threshold TH4 (in the present embodiment, for example, set to 6 dB, an example of a third predetermined value). When it is determined that the difference is equal to or smaller than the fourth threshold TH4 in a determination result thereof (NO in S304), the processing flow returns to step S302.

In contrast, when it is determined that the difference is larger than the fourth threshold TH4 (YES in S304), the acoustic processing unit 34 differentiates the peak Vpeak of the detected utterance signal V, and determines whether a differential result thereof (differential value ΔVpeak) is larger than a fifth threshold TH5 (in the present embodiment, for example, set to 3 dB, an example of a fourth predetermined value) (S305). When it is determined that the differential value ΔVpeak is equal to or smaller than the fifth threshold TH5 in a determination result thereof (NO in S305), the processing flow returns to step S302.

In contrast, when it is determined that the differential value ΔVpeak is larger than the fifth threshold TH5 (YES in S305), the acoustic processing unit 34 specifies a detection time of a peak of the utterance signal V and detects a peak period Tvpeak of the utterance signal V That is, when it is determined that a difference between the peak Vpeak of the utterance signal V during a predetermined period detected by the bone-conduction sensor 9 and the average value Vave of the utterance signal V during the predetermined period is larger than the fourth threshold TH4 and the differential value ΔVpeak (an example of a change amount) of the peak Vpeak of the utterance signal V during the predetermined period is larger than the fifth threshold TH5, the acoustic processing unit 34 specifies the detection time of the peak of the utterance signal V (S304 to S306).

After detecting the peak period Tvpeak, the acoustic processing unit 34 determines whether the peak period Tvpeak is within a predetermined period range (in the present embodiment, for example, a period range of 90 to 120 Hz corresponding to a period of the traveling motion) (S307). When it is determined that the peak period Tvpeak is not within the predetermined period range in a determination result thereof (NO in S307), the processing flow returns to step S302.

In contrast, when it is determined that the peak period Tvpeak is within the predetermined period range (YES in S307), the BPF and gain setting unit 33 performs a low pass filter processing on the utterance signal V to remove a high-frequency component and only allow a low-frequency component to pass in terms of frequency specification of a level related to the utterance signal V. Thereafter, the BPF and gain setting unit 33 performs a band pass filter processing on a range including the peak period Tvpeak (S308).

Further, the BPF and gain setting unit 33 determines whether an absolute value (an example of a time difference) of a difference between the peak period Tzpeak of a vibration sound in the Z-axis direction and the peak period Tvpeak of the utterance signal V is less than a sixth threshold TH6 (in the present embodiment, for example, 5 Hz, an example of a fifth predetermined value) (S309). When it is determined that the absolute value of the difference is equal to or larger than the sixth threshold TH6 in a determination result thereof (NO in S309), the processing flow returns to step S302.

In contrast, when it is determined that the absolute value of the difference between the peak period Tzpeak of the vibration sound in the Z-axis direction and the peak period Tvpeak of the utterance signal V is less than the sixth threshold TH6 (YES in S309), the BPF and gain setting unit 33 stops suppression of the utterance signal V (END). That is, when the periods of the vibration sound (the component in the Z-axis direction) and the utterance signal V are approximate to each other, the gain of the cancellation signal is not set, and therefore the ANC unit 42 does not generate the cancellation signal. Similarly, also in the present embodiment, the fourth threshold TH4, the fifth threshold TH5, and the sixth threshold TH6 are set and stored in advance in, for example, the ROM 35, but may be provided so as to be variably optimized using learning data (described later) generated by a machine learning method such as deep learning. Since the fifth threshold TH5 and the sixth threshold TH6 can be variably adjusted, when the user U performs utterance in the motion, accuracy of preventing the noise reduction function from being accidentally operated is further improved.

As described above, the headphone 1 (an example of the acoustic apparatus) according to the third embodiment further includes the bone-conduction sensor 9 (an example of the utterance sensor) that detects utterance of the user U, and the acoustic processing unit 34 (an example of the utterance peak detection unit) that specifies the detection time of the peak Vpeak of the utterance signal V when it is determined that the difference between the peak Vpeak of the utterance signal V (an example of the acoustic signal) during the predetermined period detected by the bone-conduction sensor 9 and the average value Vave of the utterance signal V during the predetermined period is larger than the fourth threshold TH4 (an example of the third predetermined value) and the differential value ΔVpeak (an example of the change amount) of the peak Vpeak of the utterance signal V during the predetermined period is larger than the fifth threshold TH5 (an example of the fourth predetermined value). Further, the BPF and gain setting unit 33 (an example of the signal processing unit) stops the suppression of the sound signal when the absolute value (an example of the time difference) of the difference between the peak period Tzpeak (an example of the peak detection time) of the vibration sound in the Z-axis direction and the peak period TN-peak (an example of the peak detection time) of the utterance signal V is less than the sixth threshold TH6 (an example of the fifth predetermined value).

Therefore, even when the user U performs utterance in the motion, it is possible to prevent the noise reduction function from being accidentally operated. Accordingly, the user U can perform calling by the headphone 1 without any trouble.

Fourth Embodiment

A fourth embodiment according to the present disclosure will be described with reference to FIGS. 12 and 13. Since the description of the same or equivalent parts as those of the first to third embodiments described above is repeated, the same reference numerals are given to the drawings, and the description thereof may be omitted or simplified.

[Configuration of Circuit Board]

A configuration of the circuit board 20 according to the present embodiment will be described with reference to FIG. 12. FIG. 12 is a functional block diagram exemplifying a processing of the circuit board 20 of the present embodiment. In the description of FIG. 12, the same reference numerals are given to repeated description of the configurations as in FIG. 4, the description thereof will be simplified or omitted, and different contents will be described.

Figure 12:
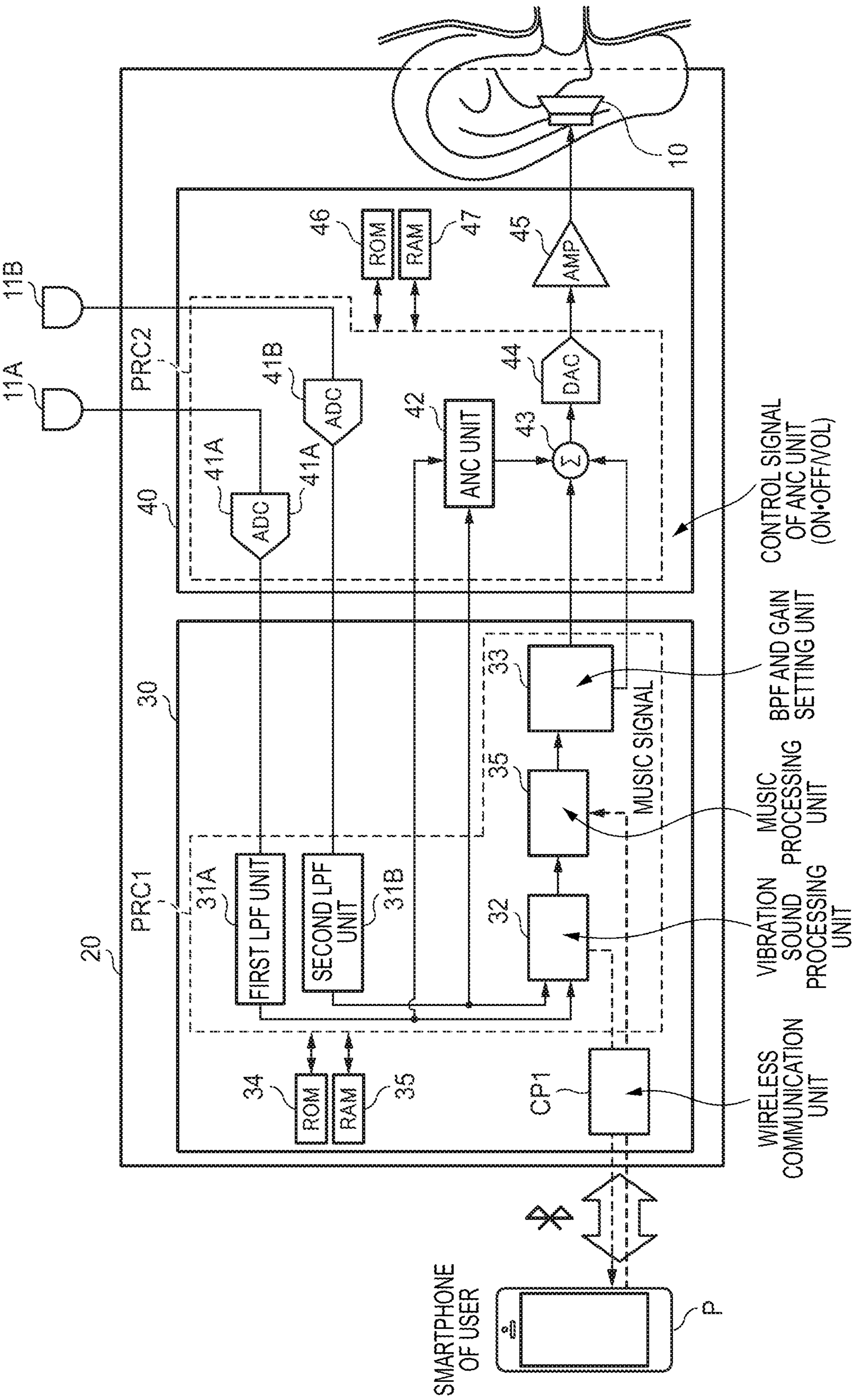
FIG. 12 is a functional block diagram exemplifying a processing of a circuit board of a fourth embodiment.

As shown in FIG. 12, in the present embodiment, a case where the headphone 1 is used not for a telephone application but for a music playback application is described as an example, and a music processing unit 35 (an example of a music peak detection unit) is further provided on the circuit board 20 of the present embodiment as compared with the configuration (see FIG. 8) of the circuit board 20 of the second embodiment described above.

The music processing unit 35 receives a music signal transmitted from the smartphone P of the user U via a wireless communication unit of the circuit board 20. That is, the music processing unit 35 inputs the music signal from the smartphone P possessed by the user U. Then, the music processing unit 35 specifies a detection time of a peak of the music signal when a predetermined condition is satisfied based on the reception result.

The music processing unit 35 has a function of a low pass filter, and is provided so as to be able to remove a high-frequency component from components of the music signal and only allow a low-frequency component to pass for the received music signal. In the present embodiment, the music processing unit 35 is also provided so as to be able to receive a control signal or the like from the vibration sound processing unit 32, that is, the vibration sound processing unit 32 is not directly connected to the BPF and gain setting unit 33, but is indirectly connected to the BPF and gain setting unit 33 via the music processing unit 35. Other configurations are similar to those of the circuit board 20 of the second embodiment.

[Processing Flow of Circuit Board]

Next, a processing flow of the circuit board 20 according to the present embodiment will be described with reference to FIG. 13. FIG. 13 is a flowchart exemplifying the processing flow of the circuit board 20 shown in FIG. 12.

Figure 13:
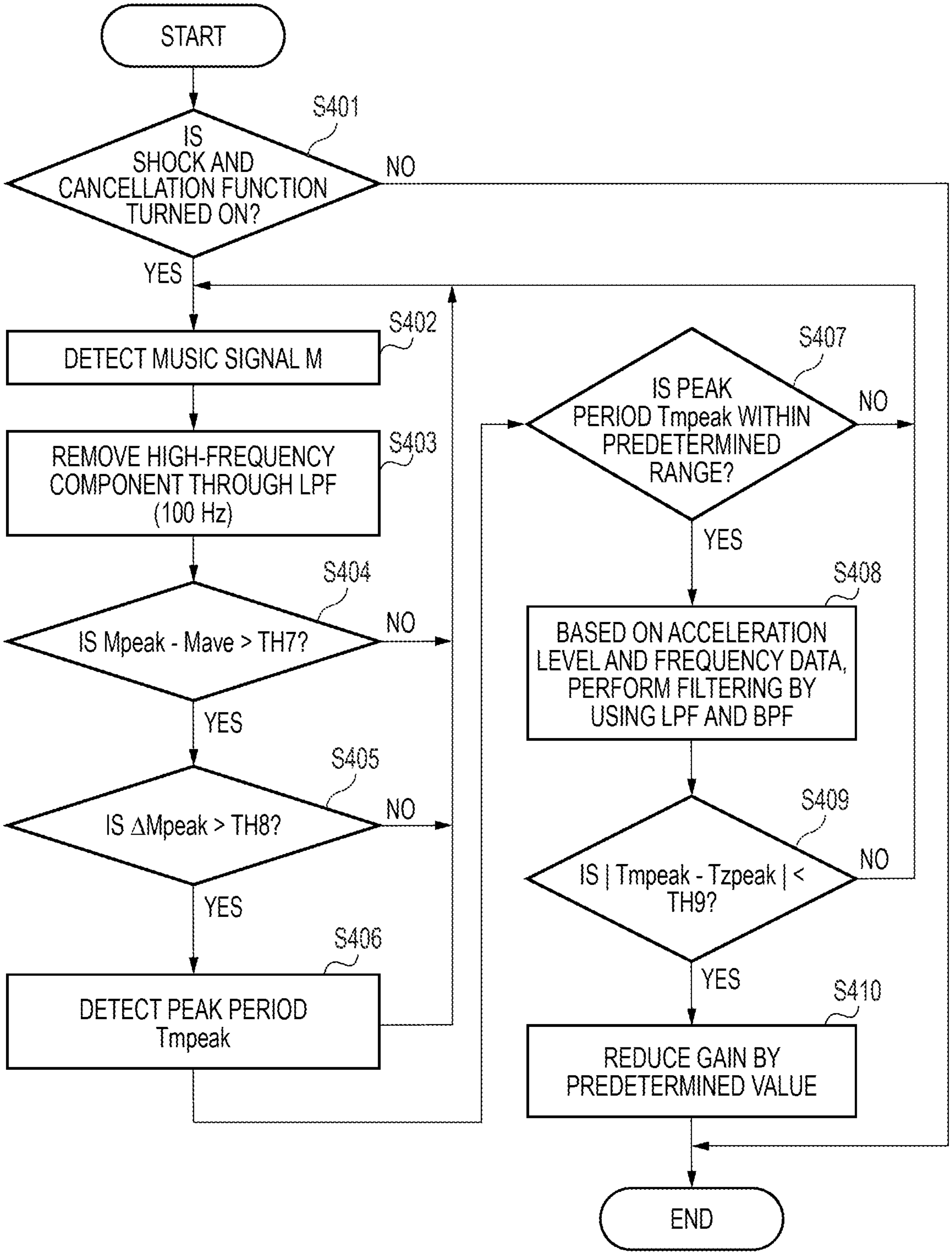
FIG. 13 is a flowchart exemplifying a processing flow of the circuit board shown in FIG. 12.

As shown in FIG. 13, the circuit board 20 of the headphone 1 determines whether a shock and cancellation function is turned on in an application of the smartphone P of the user U through wireless communication (S401). When it is determined that the shock and cancellation function is not turned on in a determination result thereof (NO in S401), the processing flow ends. In contrast, when it is determined that the shock and cancellation function is turned on (YES in S401), the music processing unit 35 detects a music signal M wirelessly transmitted from the smartphone P of the user U (S402).

The music processing unit 35 sets, for example, 100 Hz as a cutoff frequency for the detected music signal M, and removes a high-frequency component of the music signal M. With the removal, the music processing unit 35 only allows a low-frequency component of the music signal M to pass (S403).

Further, the music processing unit 35 detects a peak Mpeak of the music signal M, and then calculates a difference between the detected peak Mpeak of the music signal M during a predetermined period and an average value Mave of the music signal M during the predetermined period. The music processing unit 35 determines whether the difference is larger than a seventh threshold TH7 (in the present embodiment, for example, set to 6 dB, an example of the third predetermined value). When it is determined that the difference is equal to or smaller than the seventh threshold TH7 in a determination result thereof (NO in S404), the processing flow returns to step S402.

In contrast, when it is determined that the difference is larger than the seventh threshold TH7 (YES in S404), the music processing unit 35 differentiates the peak Mpeak of the detected music signal M, and determines whether a differential result thereof (differential value ΔMpeak) is larger than an eighth threshold TH8 (in the present embodiment, for example, set to 3 dB, an example of the fourth predetermined value) (S405). When it is determined that the differential value ΔMpeak is equal to or smaller than the eighth threshold TH8 in a determination result thereof (NO in S405), the processing flow returns to step S402.

In contrast, when it is determined that the differential value ΔMpeak is larger than the eighth threshold TH8 (YES in S405), the music processing unit 35 specifies a detection time of the peak of the music signal M, and detects a peak period Tmpeak of the music signal M (S406).

That is, the music processing unit 35 inputs the music signal M from the smartphone P possessed by the user U, and specifies a detection time of the peak Mpeak of the music signal M when it is determined that the difference between the peak Mpeak of the music signal M during the predetermined period and the average value Mave of the music signal M during the predetermined period is larger than the seventh threshold TH7 and the differential value ΔMpeak of the peak Mpeak of the music signal M during the predetermined period is larger than the eighth threshold TH8 (S404 to S406).

After detecting the peak period Tmpeak, the acoustic processing unit 34 determines whether the peak period Tmpeak is within a predetermined period range (in the present embodiment, for example, a period range of 90 to 120 Hz corresponding to a period of a traveling motion) (S407). When it is determined that the peak period Tmpeak is not within the predetermined period range in a determination result thereof (NO in S407), the processing flow returns to step S402.

In contrast, when it is determined that the peak period Tmpeak is within the predetermined period range, the BPF and gain setting unit 33 performs a low pass filter processing on the music signal M to remove a high-frequency component and only allow a low-frequency component to pass in terms of frequency specification of a level related to the music signal M. Thereafter, the BPF and gain setting unit 33 performs a band pass filter processing on a range including the peak period Tmpeak (S408).

Further, the BPF and gain setting unit 33 determines whether an absolute value (an example of a time difference) of a difference between the peak period Tzpeak of a vibration sound in the Z-axis direction and the peak period Tmpeak of the music signal M is less than a ninth threshold TH9 (in the present embodiment, for example, 5 Hz, an example of the fifth predetermined value) (S409). When it is determined that the absolute value of the difference is equal to or larger than the ninth threshold TH9 in a determination result thereof (NO in S409), the processing flow returns to step S402.

In contrast, when it is determined that the absolute value of the difference between the peak period Tzpeak of the vibration sound in the Z-axis direction and the peak period Tmpeak of the music signal M is less than the ninth threshold TH9 (YES in S409), the BPF and gain setting unit 33 reduces a gain of a cancellation signal by a predetermined value (in the present embodiment, for example, 3 dB, an example of a sixth predetermined value) (S410). That is, when the periods of the vibration sound (a component in the Z-axis direction) and the music signal M are approximate to each other, the gain of the cancellation signal is set to be reduced, and the ANC unit 42 generates a cancellation signal with the gain set to be reduced. Similarly, also in the present embodiment, the seventh threshold TH7, the eighth threshold TH8, and the ninth threshold TH9 are set and stored in advance in, for example, the ROM 35, but may be provided so as to be variably optimized using learning data (described later) generated by a machine learning method such as deep learning. Since the third threshold TH3 can be variably adjusted, even when the user U reproduces music in a motion, accuracy of preventing the noise reduction function from being excessively operated (excessive effectiveness) is further improved.

As described above, the headphone 1 (an example of the acoustic apparatus) according to the fourth embodiment further includes the music processing unit 35 (an example of the music peak detection unit) that inputs the music signal M from the smartphone P (an example of the terminal) possessed by the user U, and specifies the detection time of the peak Mpeak of the music signal M when it is determined that the difference between the peak Mpeak of the music signal M during the predetermined period and the average value Mave of the music signal M during the predetermined period is larger than the seventh threshold TH7 (an example of the third predetermined value) and the differential value ΔMpeak (an example of the change amount) of the peak Mpeak of the music signal M during the predetermined period is larger than the eighth threshold TH8 (an example of the fourth predetermined value). Further, when the absolute value (an example of the time difference) of the difference between the peak period Tzpeak (an example of the peak detection time) of the vibration sound and the peak period Tmpeak (an example of the peak detection time) of the music signal M is less than the ninth threshold TH9 (an example of the fifth predetermined value), the BPF and gain setting unit 33 (an example of the signal processing unit) reduces the gain of the cancellation signal by the predetermined value (an example of the sixth predetermined value).

Therefore, even when the user U reproduces the music in the motion, the noise reduction function can be prevented from being excessively operated (excessive effectiveness). Accordingly, the user U can listen to the music with the headphone 1 without any trouble.

As described above, when all or some of the first threshold TH1, the second threshold TH2, and the predetermined period range of the first embodiment, the third threshold TH3 of the second embodiment, the fourth threshold TH4, the fifth threshold TH5, and the sixth threshold TH6 of the third embodiment, and the seventh threshold TH7, the eighth threshold TH8, and the ninth threshold TH9 of the fourth embodiment can be variably adjusted using the learning data generated by the machine learning method such as deep learning, learning for generating each piece of learning data may be performed using one or more statistical classification techniques. Examples of the statistical classification technique include linear classifiers, support vector machines, quadratic classifiers, kernel estimation, decision trees, artificial neural networks, Bayesian techniques and/or networks, hidden Markov models, binary classifiers, multiclass classifiers, a clustering technique, a random forest technique, a logistic regression technique, a linear regression technique, and a gradient boosting technique. However, the statistical classification techniques used are not limited thereto. Further, generation of the learning data may be performed by a processing unit in the smartphone P that is an example of a device that is a counterpart with which the headphone 1 performs wireless communication, or may be performed by, for example, a server device connected to the smartphone P by using a network. Accordingly, the thresholds and/or the predetermined period range can be adjusted in accordance with the user U who uses the headphone 1. Further, the thresholds and/or the predetermined period range can be adjusted in accordance with a change in a use state of the headphone 1 by the user U or a change in a surrounding situation of the user U.

Although the plurality of embodiments have been described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that they also belong to the technical scope of the present disclosure. Further, components in the above-described embodiments may be optionally combined within a range not departing from the spirit of the invention.

For example, as the acceleration sensor 11 of the first embodiment and the acceleration sensor (for example, the right acceleration sensor 11A and the left acceleration sensor 11B) of the second and third embodiments, an acceleration sensor (three-axis acceleration sensor) that can periodically detect vibration components (accelerations) in three axial directions including an upper-lower direction (a vertical direction (Z-axis direction) in accordance with gravity), a front-rear direction (Y-axis direction), and a left-right direction (X-axis direction) of the user U is used. The present disclosure may use an acceleration sensor (six-axis acceleration sensor) that can periodically detect accelerations in six axial directions obtained by adding, to the above-described vibration components (accelerations) in the three axial directions, wobble components (accelerations) in three axial directions including a rotation direction around an X axis, a rotation direction around a Y axis, and a rotation direction around a Z axis (that is, "yaw, pitch, and roll"). Since such a six-axis acceleration sensor is used, determination accuracy of whether the user U is in a traveling motion state and detection accuracy of wobble of the user can be further improved, and the six-axis acceleration sensor can also be used for a posture advice to sports and athletes, and the like.

The present application is based on a Japanese patent application filed on Feb. 5, 2021 (Japanese Patent Application No. 2021-017458), and contents of which are incorporated herein by reference.

INDUSTRIAL APPLICABILITY

The present disclosure is useful as an acoustic apparatus and an acoustic control method that can efficiently reduce noise such as a vibration sound generated in accordance with a movement of a user in a motion such as jogging and that prevent deterioration in sound quality of an acoustically output sound.

REFERENCE SIGNS LIST

1: headphone (example of acoustic apparatus)
2: headband
3: main body portion
4: housing
5: opening portion
6: partition plate
7: ear pad
8A: internal microphone
8B: external microphone
8C: utterance microphone
9: bone-conduction sensor (example of utterance sensor)
10: driver (example of sound-emitting unit)
11: acceleration sensor (example of sensor)
11A: right acceleration sensor
11B: left acceleration sensor
20: circuit board
30: first circuit unit
31: LPF unit
31A: first LPF unit
31B: second LPF unit
31C: third LPF unit
32: vibration sound processing unit (example of vibration sound peak detection unit)
33: BPF and gain setting unit (example of signal processing unit)
34: acoustic processing unit (example of utterance peak detection unit)
35: music processing unit (example of music peak detection unit)
40: second circuit unit
41: analog-to-digital conversion unit
41A: first analog-to-digital conversion unit
41B: second analog-to-digital conversion unit
42: ANC unit
43: addition unit
44: digital-to-analog conversion unit
45: amplifier unit
P: smartphone

The invention claimed is:

1. An acoustic apparatus to be worn by a user in a motion, the acoustic apparatus comprising:
a sound-emitting unit that is configured to acoustically output a sound signal;
at least one sensor that is configured to periodically detect accelerations of the user in three directions including a front-rear direction, a left-right direction, and an upper-lower direction;
a vibration sound peak detection unit that is configured to detect a peak of a vibration sound based on a movement of the user when detection values of the accelerations in the front-rear direction, the left-right direction, and the upper-lower direction satisfy a predetermined condition; and
a signal processing unit that is configured to determine whether or not a time difference at which the peak of the vibration sound is detected is periodic,
wherein the signal processing unit sets a gain of a cancellation signal to be suppressed from the sound signal acoustically output from the sound-emitting unit based on the peak of the vibration sound when it is determined that the time difference at which the peak of the vibration sound is detected is periodic, and
wherein the signal processing unit specifies a detection time of the peak of the vibration sound when it is determined that a difference between a peak of the vibration sound during a predetermined period and an average value of the vibration sound during the predetermined period is larger than a first predetermined value and a change amount of the peak of the vibration sound during the predetermined period is larger than a second predetermined value.

2. The acoustic apparatus according to claim 1, wherein the vibration sound peak detection unit detects the peak of the vibration sound when it is determined that a speed in the front-rear direction is higher than a speed in the left-right direction and a speed in the upper-lower direction and an absolute value of the acceleration in the upper-lower direction is larger than an absolute value of the acceleration in the front-rear direction and an absolute value of the acceleration in the left-right direction as the predetermined condition.

3. The acoustic apparatus according to claim 1,
wherein the sensor includes a first sensor disposed around a left ear of the user and a second sensor disposed around a right ear of the user,
wherein the vibration sound peak detection unit detects a peak of a first vibration sound based on a first detection value detected by the first sensor and detects a peak of a second vibration sound based on a second detection value detected by the second sensor, and
wherein the signal processing unit derives a first gain based on a detection value of the peak of the first vibration sound, derives a second gain based on a detection value of the peak of the second vibration sound, and sets an average value of the first gain and the second gain as the gain of the cancellation signal when it is determined that a difference between the first gain and the second gain is equal to or smaller than a predetermined value.

4. The acoustic apparatus according to claim 1,
wherein the sensor includes a first sensor disposed around a left ear of the user and a second sensor disposed around a right ear of the user,
wherein the vibration sound peak detection unit detects a peak of a first vibration sound based on a first detection value detected by the first sensor and detects a peak of a second vibration sound based on a second detection value detected by the second sensor, and
wherein the signal processing unit derives a first gain based on a detection value of the peak of the first vibration sound, derives a second gain based on a detection value of the peak of the second vibration sound, and sets one of the first gain and the second gain as the gain of the cancellation signal when it is determined that a difference between the first gain and the second gain is larger than a predetermined value.

5. The acoustic apparatus according to claim 1, further comprising:

an utterance sensor that is configured to detect an utterance of the user; and an utterance peak detection unit that is configured to specify a detection time of a peak of an acoustic signal when it is determined that a difference between the peak of the acoustic signal during a predetermined period detected by the utterance sensor and an average value of the acoustic signal during the predetermined period is larger than a third predetermined value and a change amount of the peak of the acoustic signal during the predetermined period is larger than a fourth predetermined value, wherein the signal processing unit stops suppression of the sound signal when a time difference between a detection time of the peak of the vibration sound and the detection time of the peak of the acoustic signal is less than a fifth predetermined value.

6. An acoustic apparatus to be worn by a user in a motion, the acoustic apparatus comprising:

a sound-emitting unit that is configured to acoustically output a sound signal;

at least one sensor that is configured to periodically detect accelerations of the user in three directions including a front-rear direction, a left-right direction, and an upper-lower direction;

a vibration sound peak detection unit that is configured to detect a peak of a vibration sound based on a movement of the user when detection values of the accelerations in the front-rear direction, the left-right direction, and the upper-lower direction satisfy a predetermined condition; and a signal processing unit that is configured to determine whether or not a time difference at which the peak of the vibration sound is detected is periodic, wherein the signal processing unit sets a gain of a cancellation signal to be suppressed from the sound signal acoustically output from the sound-emitting unit based on the peak of the vibration sound when it is determined that the time difference at which the peak of the vibration sound is detected is periodic, wherein the sensor includes a first sensor disposed around a left ear of the user and a second sensor disposed around a right ear of the user, wherein the vibration sound peak detection unit detects a peak of a first vibration sound based on a first detection value detected by the first sensor and detects a peak of a second vibration sound based on a second detection value detected by the second sensor, wherein the signal processing unit derives a first gain based on a detection value of the peak of the first vibration sound, derives a second gain based on a detection value of the peak of the second vibration sound, and sets one of the first gain and the second gain as the gain of the cancellation signal when it is determined that a difference between the first gain and the second gain is larger than a predetermined value, and wherein the signal processing unit displays a warning message indicating that the user wobbles on a terminal possessed by the user.

7. An acoustic apparatus to be worn by a user in a motion, the acoustic apparatus comprising:

a sound-emitting unit that is configured to acoustically output a sound signal;

at least one sensor that is configured to periodically detect accelerations of the user in three directions including a front-rear direction, a left-right direction, and an upper-lower direction;

a vibration sound peak detection unit that is configured to detect a peak of a vibration sound based on a movement of the user when detection values of the accelerations in the front-rear direction, the left-right direction, and the upper-lower direction satisfy a predetermined condition;

a signal processing unit that is configured to determine whether or not a time difference at which the peak of the vibration sound is detected is periodic, wherein the signal processing unit sets a gain of a cancellation signal to be suppressed from the sound signal acoustically output from the sound-emitting unit based on the peak of the vibration sound when it is determined that the time difference at which the peak of the vibration sound is detected is periodic; and a music peak detection unit that is configured to input a music signal from a terminal possessed by the user, and to specify a detection time of a peak of the music signal when it is determined that a difference between the peak of the music signal during a predetermined period and an average value of the music signal during the predetermined period is larger than a third predetermined value and a change amount of the peak of the music signal during the predetermined period is larger than a fourth predetermined value, wherein the signal processing unit reduces a gain of the cancellation signal by a sixth predetermined value when a time difference between a detection time of the peak of the vibration sound and the detection time of the peak of the music signal is less than a fifth predetermined value.

8. An acoustic control method executed by an acoustic apparatus to be worn by a user in a motion, the acoustic control method comprising:

acoustically outputting a sound signal;

periodically detecting accelerations of the user in three directions including a front-rear direction, a left-right direction, and an upper-lower direction at at least one position;

detecting a peak of a vibration sound based on a movement of the user when detection values of the accelerations in the front-rear direction, the left-right direction, and the upper-lower direction satisfy a predetermined condition;

determining whether or not a time difference at which the peak of the vibration sound is detected is periodic, wherein when it is determined that the time difference at which the peak of the vibration sound is detected is periodic during the determination, a gain of a cancellation signal to be suppressed from the acoustically output sound signal is set based on the peak of the vibration sound; and specifying a detection time of the peak of the vibration sound when it is determined that a difference between a peak of the vibration sound during a predetermined period and an average value of the vibration sound during the predetermined period is larger than a first predetermined value and a change amount of the peak of the vibration sound during the predetermined period is larger than a second predetermined value.

9. An acoustic control method executed by an acoustic apparatus to be worn by a user in a motion, the acoustic control method comprising:

acoustically outputting a sound signal;

periodically detecting accelerations of the user in three directions including a front-rear direction, a left-right direction, and an upper-lower direction at at least one position;

detecting a peak of a vibration sound based on a movement of the user when detection values of the accelerations in the front-rear direction, the left-right direction, and the upper-lower direction satisfy a predetermined condition;

determining whether or not a time difference at which the peak of the vibration sound is detected is periodic, wherein when it is determined that the time difference at which the peak of the vibration sound is detected is periodic during the determination, a gain of a cancellation signal to be suppressed from the acoustically output sound signal is set based on the peak of the vibration sound, wherein a sensor includes a first sensor disposed around a left ear of the user and a second sensor disposed around a right ear of the user;

detecting a peak of a first vibration sound based on a first detection value detected by the first sensor;

detecting a peak of a second vibration sound based on a second detection value detected by the second sensor;

deriving a first gain based on a detection value of the peak of the first vibration sound;

deriving a second gain based on a detection value of the peak of the second vibration sound;

setting one of the first gain and the second gain as the gain of the cancellation signal when it is determined that a difference between the first gain and the second gain is larger than a predetermined value; and displaying a warning message indicating that the user wobbles on a terminal possessed by the user.

10. An acoustic control method executed by an acoustic apparatus to be worn by a user in a motion, the acoustic control method comprising:

acoustically outputting a sound signal;

periodically detecting accelerations of the user in three directions including a front-rear direction, a left-right direction, and an upper-lower direction at at least one position;

detecting a peak of a vibration sound based on a movement of the user when detection values of the accelerations in the front-rear direction, the left-right direction, and the upper-lower direction satisfy a predetermined condition;

determining whether or not a time difference at which the peak of the vibration sound is detected is periodic, wherein when it is determined that the time difference at which the peak of the vibration sound is detected is periodic during the determination, a gain of a cancellation signal to be suppressed from the acoustically output sound signal is set based on the peak of the vibration sound;

inputting a music signal from a terminal possessed by the user;

specifying a detection time of a peak of the music signal when it is determined that a difference between the peak of the music signal during a predetermined period and an average value of the music signal during the predetermined period is larger than a third predetermined value and a change amount of the peak of the music signal during the predetermined period is larger than a fourth predetermined value; and reducing a gain of the cancellation signal by a sixth predetermined value when a time difference between a detection time of the peak of the vibration sound and the detection time of the peak of the music signal is less than a fifth predetermined value.

* * * * *